US006475660B1

(12) United States Patent
Misra et al.

(10) Patent No.: US 6,475,660 B1
(45) Date of Patent: *Nov. 5, 2002

(54) RECOMBINANT LEAD-ACID CELL AND LONG LIFE BATTERY

(75) Inventors: Sudhan S. Misra, North Wales; Franz Wagner, Lansdale, both of PA (US)

(73) Assignee: C&D Charter Holdings, Inc., Wilmington, DE (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/925,354

(22) Filed: Sep. 8, 1997

Related U.S. Application Data

(62) Division of application No. 07/833,433, filed on Feb. 10, 1992, now Pat. No. 5,851,695.

(51) Int. Cl.[7] ............................................... H01M 10/20
(52) U.S. Cl. ........................ 429/96; 429/163; 429/225
(58) Field of Search ................................. 429/153, 154, 429/155, 157, 159, 163, 123, 96, 100, 225

(56) References Cited

U.S. PATENT DOCUMENTS

| 4,065,603 A | * | 12/1977 | Coibion | 429/99 |
| 4,603,093 A | * | 7/1986 | Edwards | 429/54 |
| 5,140,744 A | * | 8/1992 | Miller | 29/730 |
| 5,209,991 A | * | 5/1993 | Stocchiero | 429/66 |

* cited by examiner

Primary Examiner—Gabrielle Brouillette
Assistant Examiner—Monique M. Wills
(74) Attorney, Agent, or Firm—Hoffmann & Baron, LLP

(57) ABSTRACT

A lead-acid cell includes a case, positive and negative plates within the case, microporous separator material between adjacent plates and electrolyte in a starved amount, with the case having jar and covers joined by a weldment along overlapping cover and jars. The positive plates include a grid frame with an intermediate member extending between spaced apart generally peripheral portions of the frame, with pasted active material on the grid frame separated substantially into two portions by the intermediate member. Compressive force is adjustably continuously applied to the positive and negative plates within the case. The plates are suspended within the case at positions removed from the wall of the case, while plate growth is permitted in a manner that plate shorting is avoided.

24 Claims, 21 Drawing Sheets

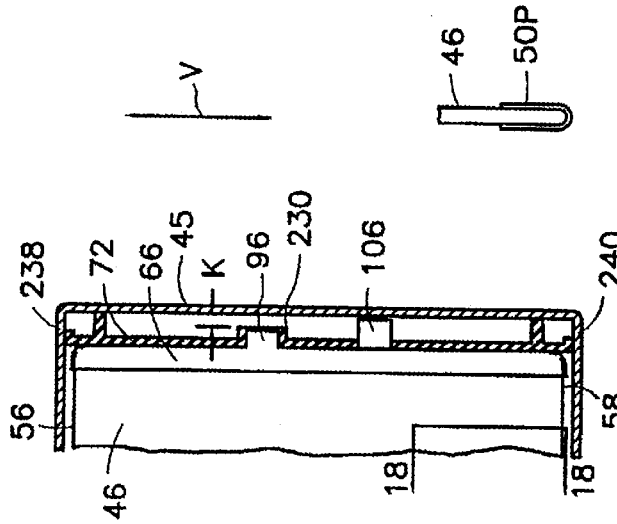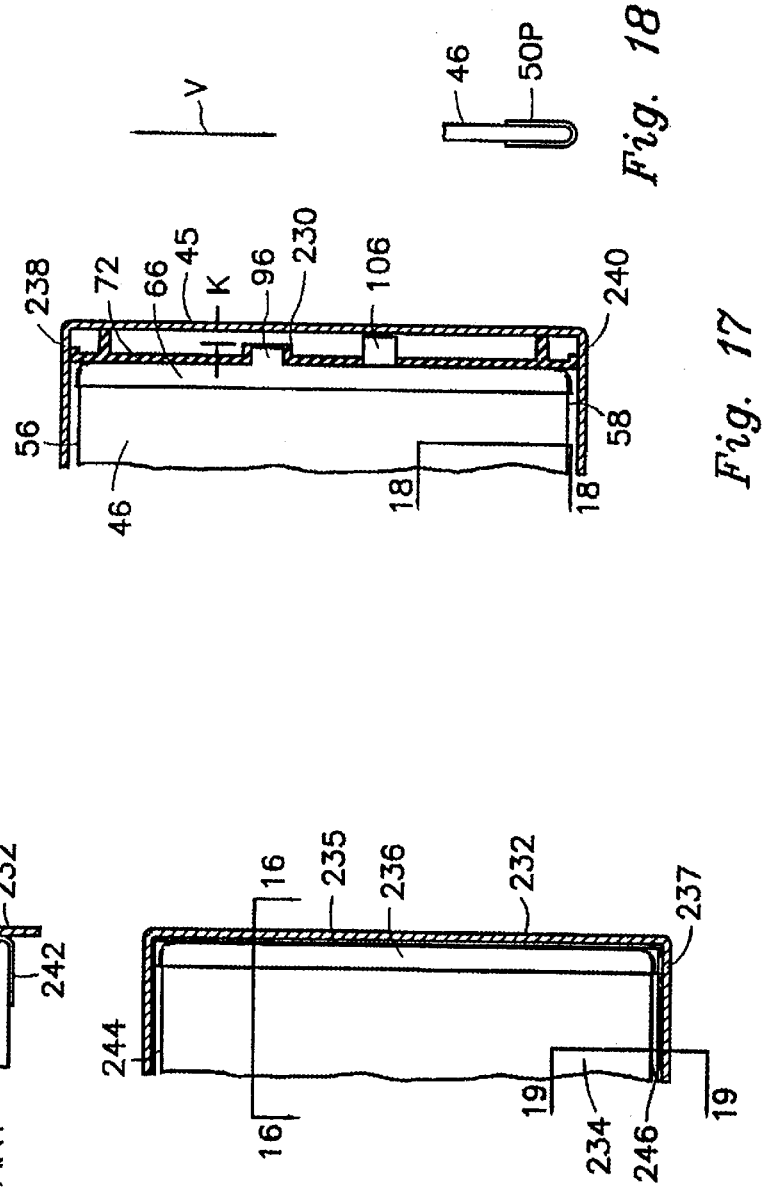

*Fig. 21*
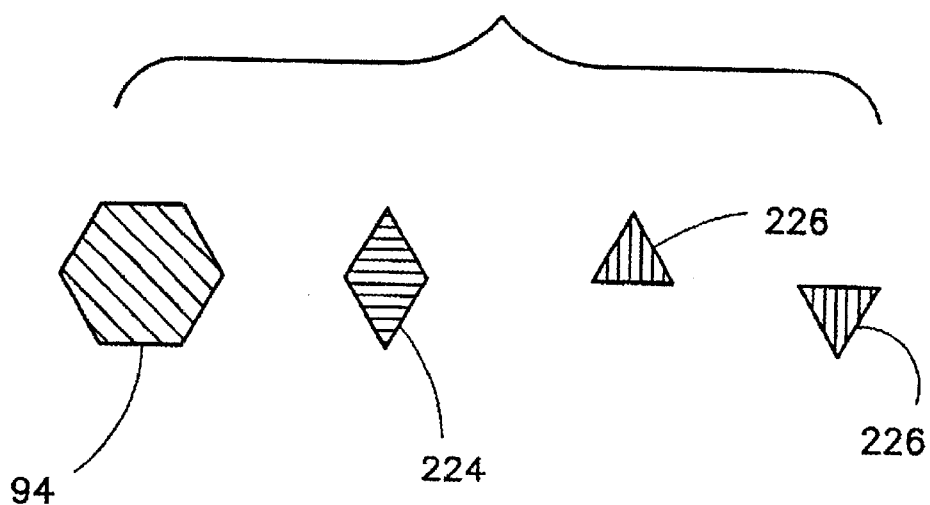
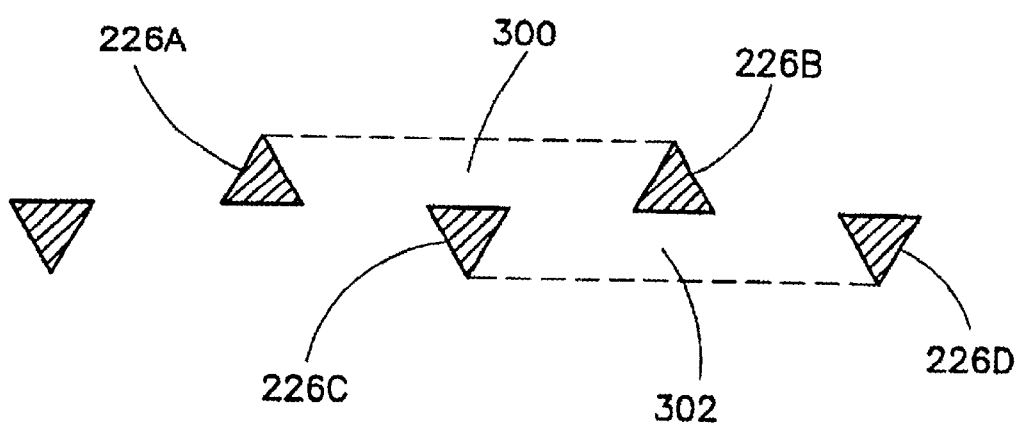
*Fig. 22*

RECOMBINANT LEAD-ACID CELL AND LONG LIFE BATTERY

CROSS-REFERENCE TO RELATED PATENT APPLICATION

This is a division of U.S. patent application Ser. No. 07/833,433 filed Feb. 10, 1992 in the names of Sudan Misra and Franz Wagner and entitled "Recombinant Lead-Acid Cell and Long Life Battery".

BACKGROUND OF THE INVENTION—FIELD OF THE INVENTION

This invention relates to long life batteries utilizing recombinant cells and to such cells.

NOMENCLATURE

As used herein the word "cell", including plurals and variants thereof, denotes a single electrochemical unit having at least one positive plate, at least one negative plate and separator material between those plates, all within a thermoplastic housing and nominally providing 2.0 volts potential.

As used herein the word "battery", including plurals and variants thereof, denotes a plurality of electrically connected cells providing a specified voltage and a specified current over a specified time.

BACKGROUND OF THE INVENTION— DESCRIPTION OF THE PRIOR ART AND ITS PROBLEMS

Recombinant lead-acid cells and batteries are known, being sold by a variety of manufacturers in the United States and elsewhere. One well-known supplier of recombinant lead-acid batteries is C & D Charter Power Systems, Inc., which sells recombinant lead-acid batteries under the trademark "Liberty Series."

Recombinant lead-acid cells are disclosed in U.S. Pat. No. 3,862,861.

A continuing problem faced by manufacturers of lead-acid cells in endeavoring to provide long life batteries utilizing such lead-acid cells, especially recombinant lead-acid cells, is inherent growth of the positive plate due to corrosion and oxidation of the lead or lead alloy grid to form lead dioxide. Because the specific volume of lead dioxide is about 21% greater than that of metallic lead, as the lead dioxide corrosion product forms, the grid grows due to built up stress. This leads to gradual loss of physical contact and electrical continuity between the grid and active material pasted on the grid and may eventually cause the grid to fracture. Loss of electrical continuity may result in failure of the cell in which the grid is located.

Another common cause of failure of such cells (which is also rooted in the plate growth phenomenon) is shorting. This occurs when positive and negative plates contact, due to stresses created within the cell, as the positive plates grow.

Positive plate growth has been known for years, being reported in "Positive Grid Design Principles" published in *The Bell System Technical Journal*, September 1970. While the phenomenon has been long known, growth of such plates and difficulties resulting therefrom is a continuing problem in lead-acid cells intended for use in long life batteries.

An additional problem sometimes encountered in recombinant cells intended for long service life is the tendency of dendrites to grow from the negative plates, especially if free electrolyte is present in a cell. The likelihood of dendrite growth is enhanced if free electrolyte is present. Free electrolyte sometimes forms in a cell during operation. Any free electrolyte collects at the bottom of the cell and hence the likelihood of dendrite growth is greatest at the cell bottom. If a dendrite grows from a negative plate to a positive plate, the plates short, damaging and possibly disabling the cell.

Another problem in recombinant cells intended for long service life is maintenance of close contact between the positive and negative plates and the microporous separator material between those plates. Close contact is important because the electrolyte is provided in only a starved amount and only part of the starved amount of electrolyte resides within the separator material. If good contact between the plates and the separator material is not maintained, the recombinant cell will not function properly.

An example of the long life battery of the general type to which this invention relates is available from the GNB division of Pacific-Dunlap, Ltd. under the trademark "Absolyte."

While the Absolyte system has achieved some commercial acceptance, it does not provide for external application of compression to its recombinant lead-acid cells. Such compression is desirable to assure maintenance of good plate-separator contact so that the electrolyte properly interacts with the plates.

Another problem in long life batteries of the general type to which this invention relates is the difficulty of replacing a cell upon failure of one of the cells in the battery. In the Absolyte system, cell replacement is cumbersome.

Yet another problem in many lead-acid cells intended for long service life is failure of the seal between the cell jar and cover, especially during manufacture. Typically during manufacture a substantial vacuum must be drawn in the cell to effectuate electrolyte flow into and distribution within the cell in the required amount and manner. Drawing a vacuum in the cell creates a substantial force on the cell jar as atmospheric pressure outside the cell presses on the jar and cover. Typically, the weakest point is the jar-cover joint or seal. Cells are prone to fail at these seals during manufacture when vacuum is drawn in the course of the electrolyte filling process.

Yet another problem in long life batteries is lack of adequate cooling for the multiple cells used to provide the required power. Typically, in the interest of saving space, cells are closely packed together without significant provision for active or passive cooling. As a result, overheating can be a problem.

SUMMARY OF THE INVENTION

In one of its aspects this invention provides a long life recombinant lead-acid battery defined by a group of recombinant lead-acid cells.

The cells may be grouped modularly in a plurality of vertically stacked interchangeable horizontal rows with facing surfaces of horizontally adjacent cells having vertically extending cooling channels formed therein. Cooling channels of the respective vertically stacked horizontal rows are substantially vertically aligned. Means are provided, preferably in the form of planar sheets, for maintaining the channels of the horizontally adjacent cells in separated disposition respecting one another.

When the cells are arranged in vertically stacked horizontal rows, plates supporting the cells preferably have holes which at least partially intersect the vertically extending channels, permitting convective air flow in a substantially vertical direction between the horizontally interchangeable adjacent cells which are arranged in vertically interchangeable rows.

In another aspect, the invention provides a long life battery including a plurality of recombinant lead-acid cells with means for applying and maintaining compressive force to pluralities of interleaved positive and negative plates, and separator material therebetween, within the cells. The force application means is preferably manually actuated and continuously applies force, preferably in a direction perpendicular to the plates. The force application means preferably includes vernier means for manually applying force selected from a continuum of available force values.

In another aspect this invention provides a long life recombinant lead-acid cell. The cell includes a case, a plurality of interleaved positive and negative lead metal alloy plates within the case, microporous separator material between respective positive and negative plates, and means for suspending the plates within the case spaced away from the case interior surfaces in the direction of plate growth without contact between positive and negative plates.

The plate suspension means aspect of the invention includes insulative, preferably planar, means for engaging the negative and positive plates and maintaining the negative and positive plates in spaced relation respecting both one another and the case in the direction of plate growth. The suspension means preferably engages the positive and negative plates at or close to respective ends of the plates and permits positive plate growth without positive plate/negative plate contact, which would produce a disabling short. The suspension means reduces risk of contact between the positive plate and the cell case, in the direction of plate growth, upon such plate growth. Such contact can increase internal stresses in the positive plate, eventually leading to plate and cell failure.

The cell advantageously lies horizontally. The plates advantageously are vertically disposed. The plate suspension system accommodates plate growth in the longitudinal direction, which is the direction of maximum plate growth, while centrally locating and supporting the plates. A portion of the plate suspension system guides a sandwiched plate-separator material assembly into the jar during cell manufacture and constrains the plate-separator material assembly from excessive movement once the assembly is in place.

Another aspect of this invention relates to plate wrapping. In this aspect of the invention, the plates are preferably wrapped with separator material substantially enveloping the plates, preventing them from shorting while permitting growth. The plates are advantageously wrapped in individual sheets. The sheets are folded about longitudinally extending edges of respective positive and negative plates. The plate wrapping aspect, together with the cell orientation aspect of the invention, reduces chances for shorts caused by dendrites from a negative plate contacting a positive plate.

In another aspect this invention provides a lead-acid cell having a stronger jar/cover seal. The cover overlaps the jar and preferably extends outwardly respecting the outer surface of the jar. A weldment of joined jar and cover material or cement connects the jar and cover substantially along the preferred optional portion of the cover contacting the jar and along the portion of the cover extending outwardly from the jar. The weldment if thermally produced is preferably homogeneous jar and cover material. The cover geometry at the position of cover engagement with the jar contributes to a larger and therefore higher strength weldment or cement bond which, in turn, contributes to the ability of the cell case, particularly the jar/cover seal portion of the case, to withstand high negative pressures during cell manufacture.

In a related aspect, this invention provides a cell case cover including an integral skirt extending generally transversely from the cover along an inner surface of the jar. The skirt reinforces the jar, in the area of jar-cover contact, to counter force resulting from pressure within the cell being lower than atmospheric. The skirt preferably substantially facingly contacts the jar inner surface and is of substantial thickness relative to its length, to provide structural reinforcement for the jar at the jar-cover joint or seal. The skirt makes the jar-cover joint or seal more resistant to fracture caused by pressure differentials between the cell interior and exterior.

In yet another aspect this invention provides an improved positive plate for lead-acid cells. The positive plate includes a grid frame having an outer periphery and at least one intermediate member extending between spaced apart portions of the grid periphery. The outer peripheral member of the grid is preferably of polygonal cross-section.

The grid preferably includes a plurality of elongated polygonal cross-section members extending between spaced portions of the peripheral member. The elongated members intersect within the outer peripheral member to define an open lattice. The lattice includes adjacent paste holding confinements offset from and communicating with one another transversely to the grid. These confinements hold paste to form the plate.

The intermediate member is preferably of polygonal cross-section and connects the elongated members at positions intermediate respective extremities thereof. The peripheral and intermediate polygonal cross-section members preferably have common length sides.

The polygon of the intermediate member preferably has at least two or more sides than polygons of the elongated members.

The polygonal shapes of the peripheral member, the intermediate member(s) and the elongated members strike an effective compromise among grid strength, grid growth, paste capacity and paste-grid adherence.

The intermediate member(s) are of substantially larger cross-section than the elongated members and preferably have substantially lower ratios of surface area to cross-sectional area. As a result, the intermediate members grow less than the elongated members as the lead oxidizes to lead dioxide.

In yet another aspect the invention provides an external cover or safety plate suspension system for cells, modules, batteries and other hazardous equipment. The cover plate suspension system permits the cover plates to be quickly positioned on or removed from the battery, or an individual module or a cell, without use of tools. The cover plate suspension system includes a bracket having a groove receiving the cover plate edge, with the groove having a mouth wider than thickness of the retained edge of the plate. The groove preferably includes bottom portions concavely convergingly curving respecting the groove mouth, from positions of separation greater than edge width to positions of separation less than safety plate edge width. The edges of the cover plates contact the curved bottom portions to provide an interference fit whereby the bracket releasably retains the cover plate.

In a yet further aspect of the invention, the lead-acid cell case may include a tubularly extruded thermoplastic circumferential jar with covers affixed to the ends of the extruded jar.

BRIEF DESCRIPTION OF THE DRAWINGS

FIG. 15 is a broken side elevation, partially in section, showing the manner in which separator material is wrapped around positive plates according to the prior art.

FIG. 16 is a broken sectional view taken at lines and arrows 16—16 in FIG. 15.

FIG. 17 is a broken side elevation, partially in section, of a lead-acid cell manifesting aspects of the invention, illustrating the manner in which separator material is wrapped about a positive plate according to aspects of the invention.

FIG. 18 is a broken sectional view taken at lines and arrows 18—18 in FIG. 17.

FIG. 21 is a schematic illustration of the cross-sectional shape of portions of the positive plate grid illustrated in FIG. 14.

FIG. 22 is a schematic partial sectional view of the positive plate grid taken at lines and arrows 22—22 in FIG. 14.

Figure 1:
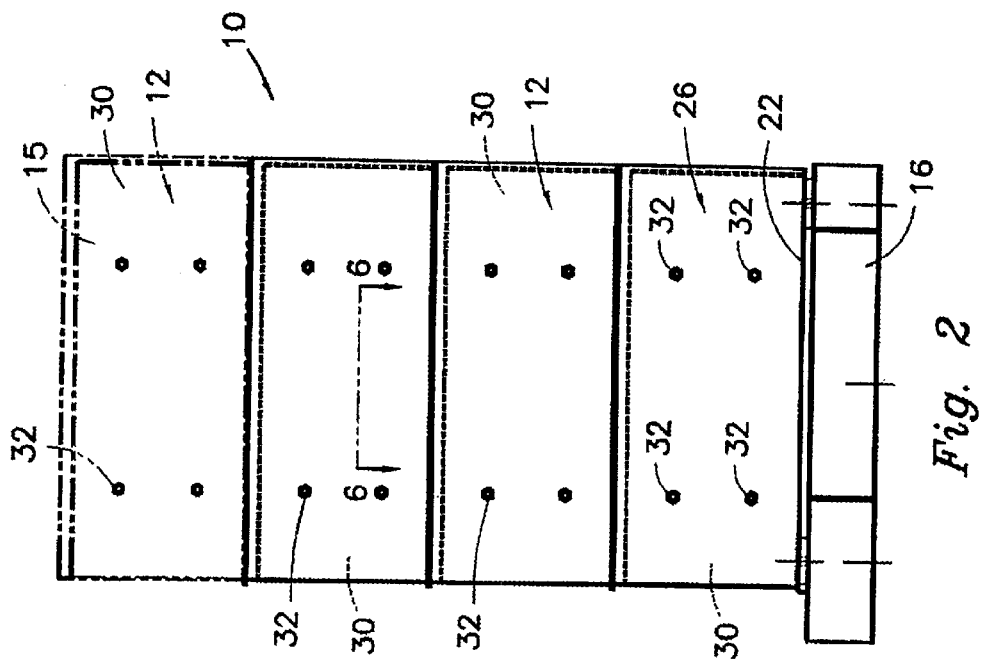
FIG. 1 is a front elevation of a modular array of lead-acid cells, manifesting aspects of the invention, constituting a long life battery manifesting aspects of the invention.

In the drawings indicator numerals correspond to numerals used in the text in describing the invention.

DESCRIPTION OF THE PREFERRED EMBODIMENTS AND BEST MODES KNOWN FOR PRACTICING THE VARIOUS ASPECTS OF THE INVENTION

Figure 2:
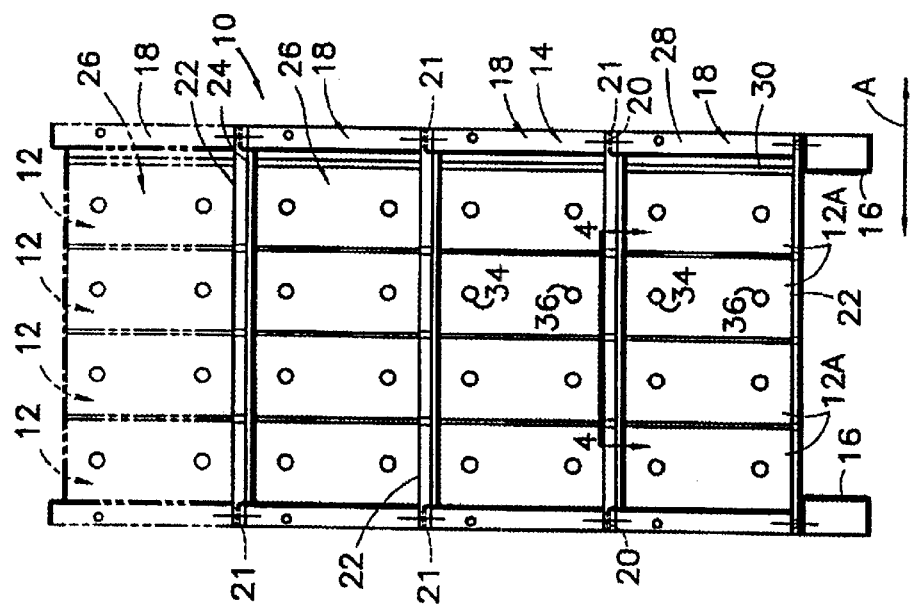
FIG. 2 is a side elevation of the array of cells illustrated in FIG. 1.

Referring to the drawings and to FIGS. 1 and 2 in particular, recombinant lead-acid cells embodying various aspects of the invention are designated generally 12 and form a part of a long life battery designated generally 10. The positive and negative terminals of cells 12 are respectively designated 34 (for the positive terminals) and 36 (for the negative terminals.) Only selected terminals of cells 12 have been numbered in FIGS. 1 and 2, to avoid drawing clutter.

Figure 3:
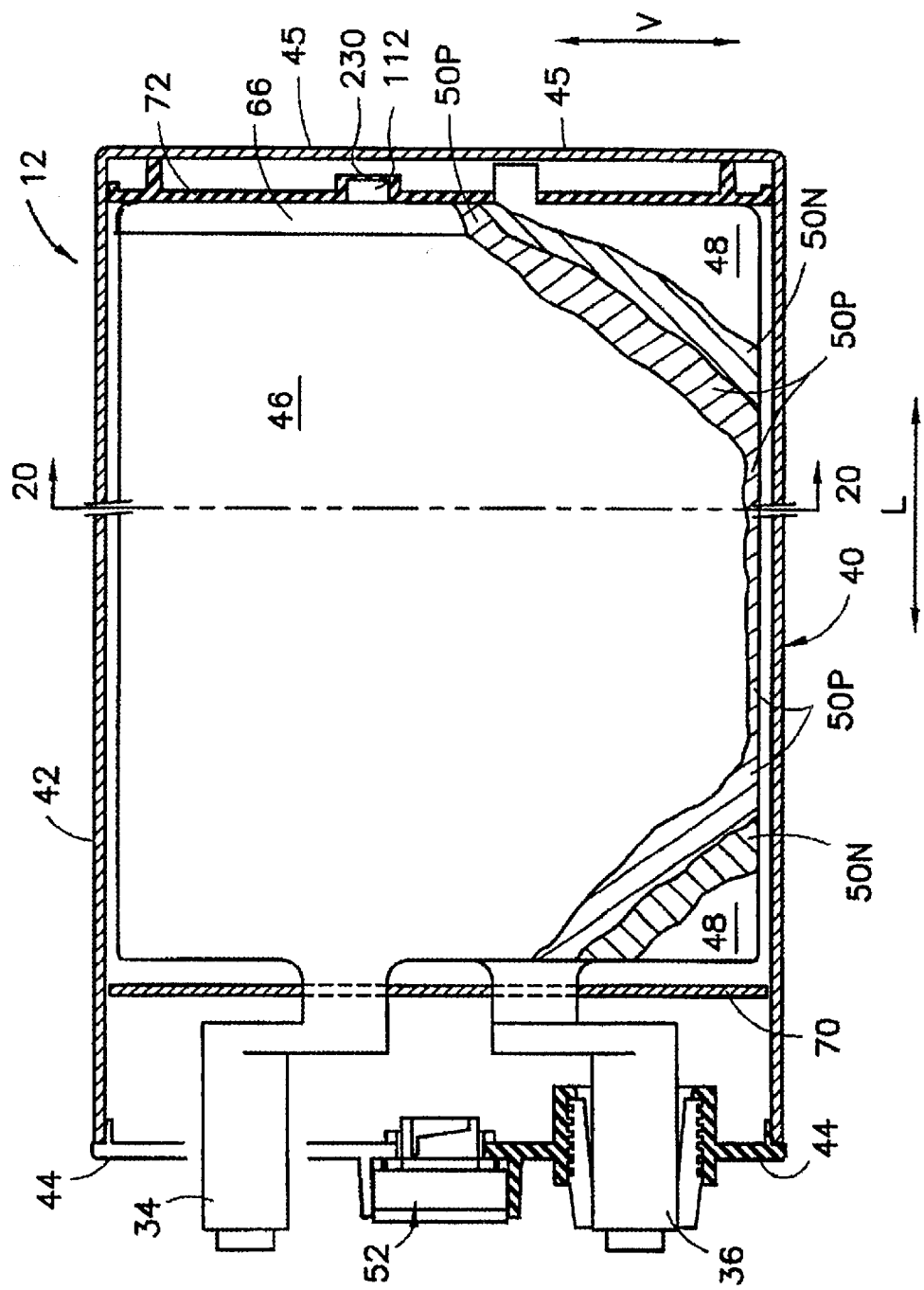
FIG. 3 is a side elevation, in section, of a lead-acid cell manifesting aspects of the invention.

As shown in FIG. 3, positive terminals 34 are connected by appropriate strapping to positive plates 46 within a cell 12. Negative terminals 36 are also connected by appropriate strapping to negative plates 48 within a cell 12, as also depicted in FIG. 3. The positive and negative strapping portions of cell 12 have not been numbered, to avoid drawing clutter.

A desired number of cells 12 may be connected in series or in parallel to define a battery 10 providing preselected voltage and current. Electrical connections among cells 12 to define long life battery 10 do not form any portion of this invention.

Each cell 12 includes a conventional resealable vent valve designated generally 52 in the drawings and best shown in FIG. 3. Resealable vent valve 52 is preferably on the horizontal centerline of the cell when the cell is in its preferred horizontally longitudinally elongated operating position as illustrated generally in the drawings and specifically in FIGS. 1, 2 and 3. Resealable vent valve 52 is for safety.

Under normal operating conditions, there is little pressure in cell 12. Resealable vent valve 52 is set to open at a positive pressure, generally between 0.5 and 2.0 pounds per square inch. Cells 12 manifesting various aspects of the invention exhibit positive internal pressures during charging, but negative internal pressures during electrolyte fill. Cells 12 may also exhibit negative pressures during operation and storage. Vent valve 52 does not let air into the interior of cell 12.

Positive and negative terminals 34, 36 respectively are sealed within a cover 44 of the cell, also shown in FIG. 3.

Modular Construction and Compression Force Maintenance Aspects

Referring to FIGS. 1 and 2, lead-acid cells 12 manifesting aspects of the invention are desirably provided in a modular assembly to define long life battery 10.

As best illustrated in FIG. 1, in a preferred modular long life battery, individual cells 12 are interchangeably arranged substantially contiguously, adjacent to one another, in horizontal rows. A plurality of horizontal rows may desirably be interchangeably stacked, vertically one above another, as illustrated in FIG. 1.

Upstanding side members 18 sandwich interchangeable cells 12 together in respective interchangeable horizontally contiguous rows. Side members 18 are connected by a bottom plate 22 and a top plate 24 and extend upwardly from bottom plate 22. Cells 12 desirably rest on bottom plate 22, as illustrated generally in FIG. 1. Suitable hardware can be provided at the front edges of bottom plates 22 to secure cells 12 thereon.

Respective side members 18 desirably include horizontal flanges 21 facilitating bolting connection and stacking of vertically adjacent side members 18, and rows of cells retained therebetween, one upon another. Center lines for appropriate bolts passing through horizontal flanges 21 are illustrated in FIG. 1. The bolts have not been shown, to avoid drawing clutter.

Referring again to FIG. 1, each pair of side members 18, together with an associated bottom plate 22 and top plate 24, define supporting structure of a module 26. A complete module 26 includes at least a pair of upstanding side members 18, associated top and bottom plates 22, 24 and a horizontal row of cells 12 on bottom plate 22. A module 26 also desirably includes pressure plate 30 and compression bolts 32 (discussed in greater detail below). Corresponding parts of respective modules are desirably identical and interchangeable.

Several modules 26 of cells 12 can be stacked on one another, as illustrated by the phantom line configuration of uppermost module 26 in FIGS. 1 and 2, to define long life battery 10. When at least two modules 26 are arranged with cells 12 stacked in the position generally illustrated in FIGS. 1 and 2, respective cells 12 are preferably generally vertically aligned, as illustrated, facilitating flow of convective cooling air vertically along the sides of horizontally adjacent cells, 12. (This feature is discussed in more detail below under the heading respecting thermal management.) The modular construction whereby each cell in a battery according to the invention rests on a bottom plate 22 and can be relieved of externally applied compression by movement of pressure plates 30, as described below, facilitates easy replacement of individual cells 12.

Each side member 18 includes an upstanding web designated generally 28 in FIG. 1. Inboard of webs 28 shown on the right side of battery 10 in FIG. 1 are pressure plates designated 30 and visible in FIG. 1. Each pressure plate 30 is slidably movable in the horizontal direction indicated by arrow A in FIG. 1, towards and away from an associated upstanding web 28. Pressure plate 30 is slidable retained between bottom plate 22 and top plate 24 in a loose, easily slidable relationship.

Pressure plates 30 have been depicted in FIG. 1 as being displaced to the left of upstanding members 18 on the right side of battery 10 in FIG. 1, to facilitate understanding of the invention. In practice, pressure plates 30, when viewed from the front as per FIG. 1, will be largely if not entirely obscured from view by upstanding forwardly facing webs 28 of side members 18. Pressure plates 30 are immediately inboard of upstanding side plate portions of side members 18 as indicated by the dotted lead lines from indicator numerals 30 in FIG. 2.

The side members 18 on the right-hand side of battery 10 in FIG. 1 are equipped with compression bolts designated 32 in FIG. 2. Compression bolts 32 reside in threaded bores through upstanding side plate portions of side members 18. (The side plate portions of side members 18 are not numbered in FIGS. 1 and 2.) Compression bolts 32, when rotated, contact pressure plates 30 and accordingly urge pressure plates 30 to the left in FIG. 1, in the horizontal direction indicated by arrow A. Individual pressure plates 30 can be moved in the direction of double-ended arrow A in FIG. 1 by appropriately rotating compression bolts 32 associated with an individual pressure plate 30 as generally illustrated in FIG. 2.

Upon moving to the left in FIG. 1, pressure plate 30 (under the influence of compression bolts 32) contacts the exterior of the case of the extreme right-hand cell 12 of a given horizontally contiguous adjacent row of cells 12, considering FIG. 1.

As illustrated in FIG. 1, the extreme left-hand cell 12 of a horizontally contiguous row of four cells rests laterally against an upstanding side plate portion of a left-hand one of side members 18. Hence, when compression bolts 32 are rotated in a clockwise direction viewed in FIG. 2, pressure plate 30 is displaced to the left in FIG. 1. This produces force on the right-most cell 12 in FIG. 1 and thereby compresses the entire horizontally contiguous adjacent row of cells 12 in FIG. 1 against the side plate portion of left-hand side member 18. By selectively turning compression bolts 32 and thereby moving pressure plates 30, increased or decreased compressive force on cells 12 in a given horizontal row, and on positive and negative plates and separators therewithin, can be achieved. Left-hand side members 18 do not include compression bolts 32. No pressure plates 30 are provided on the right side of battery 10 viewing FIG. 1.

The combination of pressure plates 30 and compression bolts 32 maintains pressure on the cell plates and separators in the cell case, substantially fixes cells 12 with respect to supporting structure defined by bottom plates 24 and side members 18, and facilitates cell replacement in the event of a failure. Pressure plates 30, bottom plates 22 and the like serve as means for maintaining the module in a selected design space and at a selected volume. Pressure plates 30 permit the cell to be squeezed to a preselected degree consistent with design of the cells for optimal operation.

A major advantage afforded by the modular assembly defining battery 10, specifically the arrangement of modules 26 as illustrated in FIGS. 1 and 2, becomes apparent in the event it is necessary to replace or repair a cell in an adjacent horizontally contiguous row. Because each horizontally adjacent contiguous cell row is supported independently by a bottom plate 22 (so that lower cells do not support the weight of cells positioned higher in the modular assembly), a cell 12A in the bottom horizontally contiguous adjacent row of cells can be replaced easily without disturbing cells of modules located above the cell requiring service or replacement. The cells are not fitted together to define a pigeon hole-type matrix but rather rest on bottom plates 22. This means that a given cell can be easily replaced.

Upon a cell failure, compression bolts 32 are merely backed off to move an associated pressure plate 30 to the right in FIG. 1, permitting the failed cell to be electrically disconnected and pulled out of module 26. A replacement cell is then substituted and electrically connected with remaining cells 12 defining long life battery 10.

The cases of cells 12 are denoted generally 40 in the drawings. Cases 40 are preferably thermoplastic and consist of a jar portion 42 and a cover portion 44. The jar 42 is preferably of parallelepiped configuration and has one open side, which is closed upon cell assembly by cover 44.

Walls of jar 42 are sufficiently flexible that compressive force applied to the exterior of a cell case 40, specifically to jar 42, in a direction perpendicular to the generally planar positive and negative plates within case 40, deflects jar wall. As a result, compressive force provided by pressure plate 30 is applied to a positive plate/separator/negative plate/separator/positive plate, etc. assembly within case 40. The positive and negative plates and separator material assembly is sandwiched by and between the two oppositely facing jar walls.

The force externally applied to cell cases 40 (when pressure plate 30 is displaced to the left in FIG. 1) controls and maintains plate-separator contact and compression within the four exemplary cells 12 of a module 26. Maintaining close facing complemental contact between the separator material and the individual positive and negative cell plates is important to assure proper operation of recombinant cells 12.

Compression bolts 32 may be of any suitable length. Preferably, bolts 32 should be designed so that when bolts 32 are fully tightened and bottomed-out, the pressure applied to the cell plates and separators does not exceed a maximum design pressure.

While the modules 26 have been illustrated in FIG. 1 as including four cells 12, module 26 may include any number of horizontally adjacent cells 12. Similarly, while compression bolts 32 and pressure plates 30 have been illustrated in FIGS. 1 and 2 and described above to provide the means for maintaining compressive force on plates and separators within cells 12, any suitable means which may be adjusted to provide such compressive force may be used and is within the purview of the invention.

Thermal Management Aspects

An important aspect of the invention is the thermal design of the long life battery 10.

Figure 4:
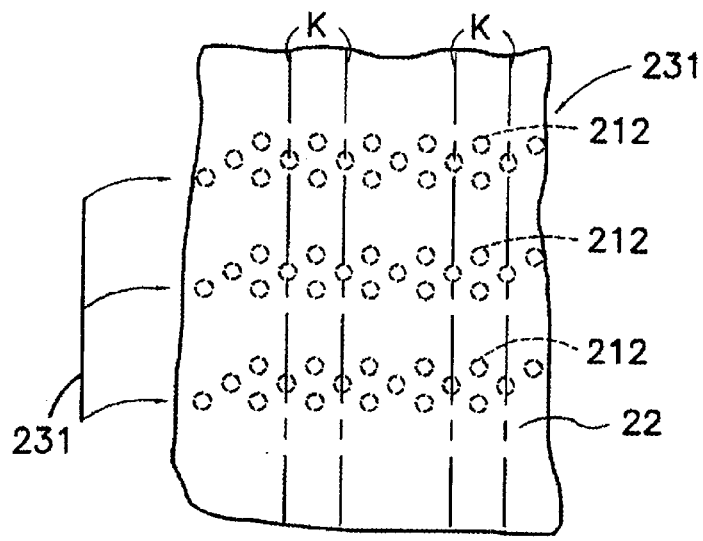
FIG. 4 is a broken sectional view of a cell support plate manifesting aspects of the invention, taken at generally at lines and arrows 4—4 in FIG. 1.
Figure 6:
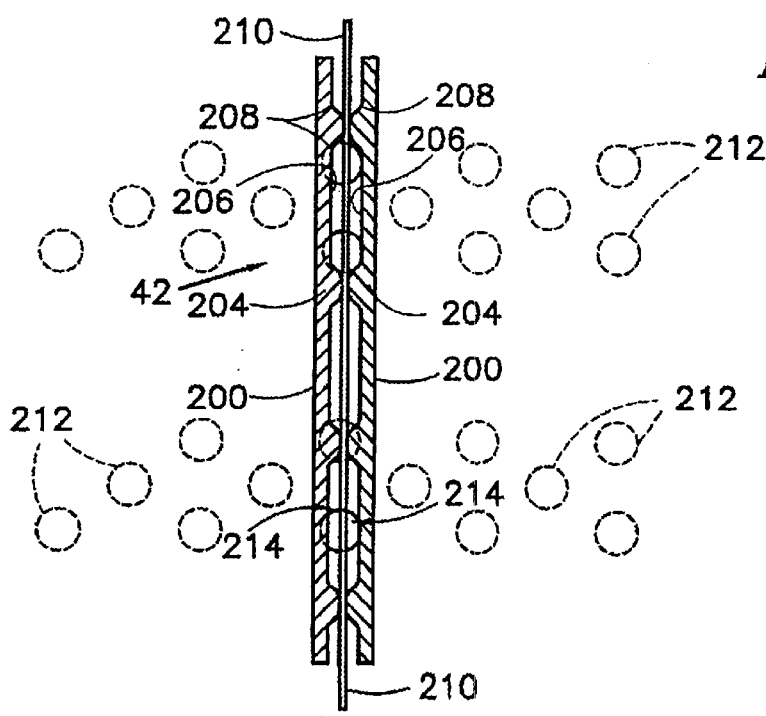
FIG. 6 is a broken sectional view of cell jar walls manifesting aspects of the invention, taken at lines and arrows 6—6 in FIG. 2.

Bottom plate 22, as illustrated in FIG. 4 and, to a lesser extent, to FIG. 6, and top plate 24, defining parts of the long life battery 10, are preferably perforated. As best shown in FIG. 4, bottom plate 22 has holes 212 therein and is of substantial thickness to provide the required rigidity to support cells 12. Contrasting, top plate 24 does not bear any structural load and, accordingly, can be highly perforated and even screen-like. The perforate nature of top plate 24 has not been illustrated in the drawings.

As shown in FIG. 4, a plurality of holes 212 run vertically through bottom plate 22, respecting the orientation of bottom plate 22 shown in FIGS. 1 and 2. The holes have not been illustrated in FIGS. 1 and 2, to avoid drawing clutter.

Holes 212 through bottom plate 22 and the screen-like character of top plate 24 facilitate natural and/or forced convective cooling of the cells in the long life battery, which may be necessary during system operation.

Preferably, each bottom plate 22 has plurality of holes 212 positioned in generally transversely extending rows designated 231 in FIG. 4; other patterns for holes 212 may also be used. Dotted lines K denote extreme outer side surfaces of jar walls of adjacent cells 12 resting on bottom plate 22. Rows 231 of holes 212 are generally transverse to longitudinally elongated horizontally adjacent cells 12 whose lateral extremities correspond to dotted lines K. The intersecting geometry of spaces between dotted lines K, denoting longitudinally and vertically extending spaces between adjacent cells 12 resting on bottom plate 22, and holes 212 in rows 231, insures that some of holes 212 fall within and communicate with the longitudinally and vertically extending space between adjacent cells 12, when cells 12 are in place on bottom plate 22. Communication between holes 212 and longitudinally and vertically extending space between adjacent cells 12 defines a plurality of generally vertically extending air channels. These air channels run from the bottom to the top of battery 10, between respective facing pairs of horizontally adjacent cells 12, where pairs of cells 12 are generally vertically aligned as illustrated in FIG. 1.

Figure 5:
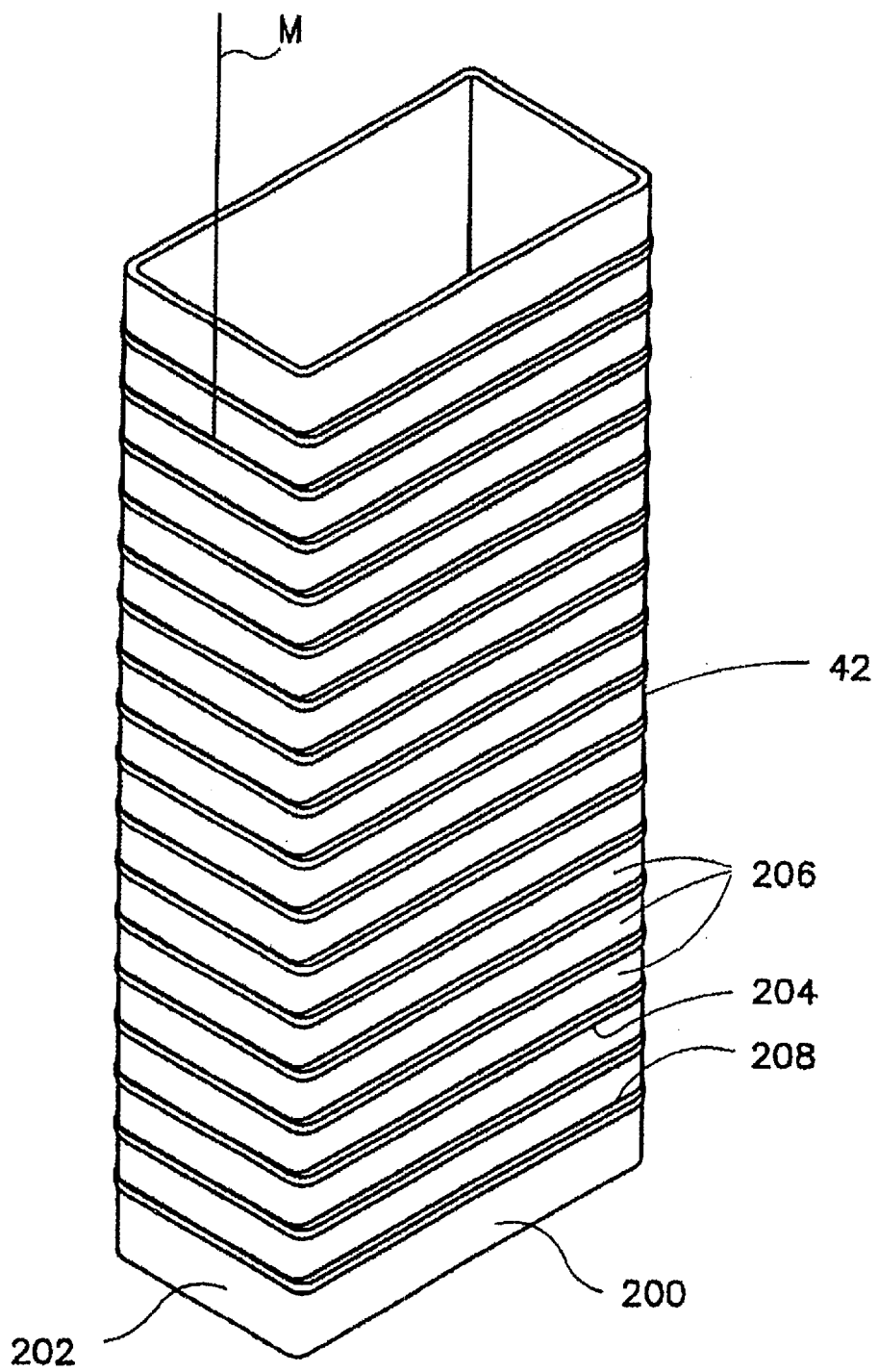
FIG. 5 is an isometric view of a jar of a cell case embodying aspects of the invention.

Each cell 12 includes (in addition to lead metal alloy plates, separator material and electrolyte) a thermoplastic case which includes preferably closed bottom jar 42, illustrated generally in FIG. 5, and cover 44 shown in FIGS. 1 and 3. Jar 42 is elongated in the direction perpendicular to the paper considering FIG. 1 and in the plane of the paper considering FIG. 2. Jar 42 has an open interior and is preferably but not necessarily generally rectangular in transverse cross-section, having a longer side 200 and a shorter side 202, as shown in FIG. 5. The closed bottom of jar 42 is not visible in FIG. 5 due to the manner in which jar 42 has been isometrically illustrated, in a generally vertical orientation. However, it is to be understood that the preferred orientation of jar 42 is in a horizontal orientation with the longitudinal axis of jar 42 running generally horizontally, as generally illustrated in FIG. 3.

Figure 7:
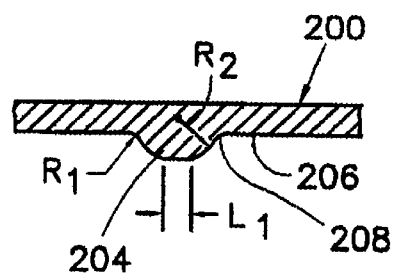
FIG. 7 is a broken sectional view showing details of the jar wall illustrated in FIG. 6.

Jar 42 preferably includes plurality of raised ribs 204 which are preferably parallel to one another and spaced evenly along longer, longitudinally extending side 200 of jar 42 as shown in FIG. 5. Ribs 204 are preferably molded in place when jar 42 is fabricated, preferably by injection molding. Ribs 204 preferably emerge from a planar surface 206 of longer, longitudinally extending side 200 and display a gently curved radius at the points of emergence, identified as 208 in FIGS. 5, 6 and 7, where ribs 204 emerge from surface 206.

Adjacent cell jars 42 are separated by preferably metal sheets 210 illustrated in FIG. 6. Raised ribs 204 of jars 42 contact sheet 210. With this arrangement, sheets 210 prevent interlocking engagement of raised ribs 204. Sheets 210 are preferably metal, to provide greater conductivity. The principal function of sheets 210 is to prevent interlocking engagement of raised ribs 204 by physically separating corresponding facing ribs 204 of corresponding facing jar sides 200 from one another. The thermal conduction function of sheets 210 is secondary. Indeed it is not necessary that sheets 210 be metal.

As apparent from FIGS. 4 and 6, the portions of jar wall planar exterior surfaces 206 intermediate respective adjacent raised ribs 204, together with sheet 210, define generally vertical channels for generally vertical convective air flow along the longer side 200 of jar 42. The vertical air flow channels are designated generally 214 in FIG. 6. Air may be permitted to naturally convect along the exterior surfaces of jar 42 to cool cells 12. Optionally, fans may provide forced convective cooling of the jar exterior.

Sheet 210, when metal, may help to carry heat away from cells 12, adding to the cooling effect provided by convective air flow through the vertically extending channels. Since the principal function of sheet 210 is to prevent interlocking engagement of raised ribs 204, sheet 210 is preferably quite thin, being only sufficiently thick to be self-supporting and sufficiently rigid to resist deformation when contacted by ribs 204. Of course, the thinner sheet 210, the less thermal conductivity will be provided.

Jar 42 is preferably molded, most preferably injection molded. Raised ribs 204 are preferably formed in place when jar 42 is molded. The mold for jar 42 may be configured so that raised ribs 204 are most prominent on longer side 200 of jar 42. Preferably, the jar mold opens so that the mold parting line runs vertically along shorter side 202 of jar 42, in the manner indicated by line M in FIG. 5. To facilitate fabrication of ribs 204 and to conserve plastic material, the mold for jar 42 may be configured so that ribs 206 substantially diminish in cross section as they approach mold parting line M running vertically along shorter side 202 of jar 42.

The radius or curvature at rib emergence position 208 enhances distribution of load forces within and along the jar wall. Ribs 204, in addition to defining vertical channels for vertical convective cooling air flow along the jar wall, provide reinforcing strength for the wall.

Each rib 204 preferably has a flat exteriorly facing central surface. The curved radius at point of emergence 208 of rib 204 from surface 206 is designated $R_1$ in FIG. 7; the preferred spherical radius of an outwardly facing portion of rib 204 is designated $R_2$ in FIG. 7 and the preferred outwardly facing planar central surface of raised rib 204 is designated by dimensional arrow $L_1$ in FIG. 7.

While the preferred fabrication of jar 42 is by molding, jar 42 may also be extruded, like a tube. If the jar is formed by extrusion, top and bottom covers are necessary to close respective ends of the tubular extrusion defining the jar.

While use of sheets 210 is preferable to maintain ribs 204 separated one from another and to prevent interlocking engagement of ribs 204, any suitable means may be used to space facing ribs 204 from one another.

Among other structures contemplated for providing the spacing function is a honeycomb-like or corrugated structure available commercially and fabricated from either metal or plastic. (The structure looks much like the cross-section of cardboard sheets used in conventional corrugated boxes.) Such corrugated structure, having vertical channels extending therethrough the planar sheets defining the outer surfaces, may be simply dropped in place between facing jar walls, with the external planar sheet surfaces of the corrugated metal contacting the jar wall exterior surfaces. Other suitable means for separating ribs 204 and providing the vertical flow of cooling air may also be used.

Plate Suspension System Aspects of the Invention

An important aspect of this invention is the suspension of the positive and negative plates, within cell case 40 defined by cover 44 and jar 42, in a manner that positive plate growth, is permitted especially in the direction of maximum plate growth but probability of shorting of the cell plates, by contact between positive and negative plates is minimized. Plate suspension is best illustrated in FIGS. 3 and 8 through 12.

Figure 8:
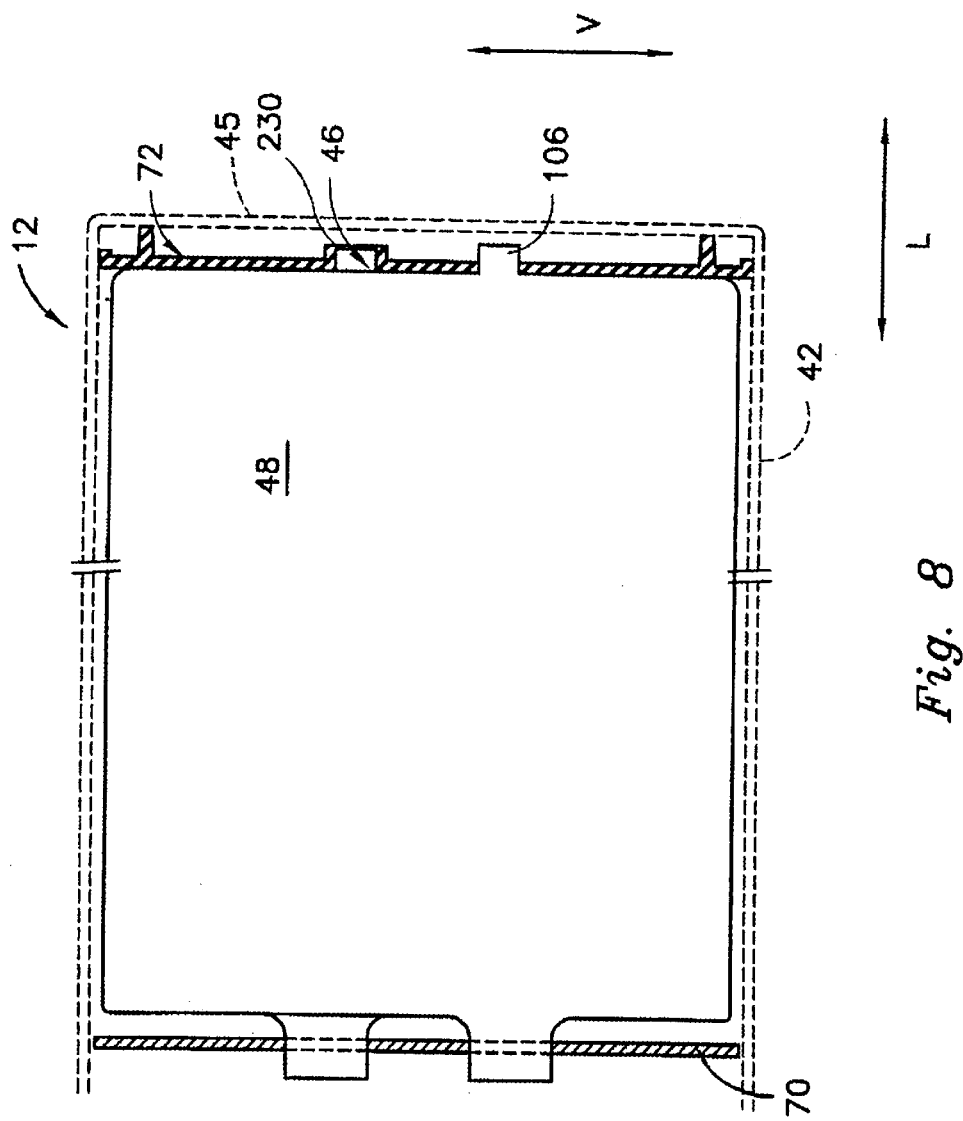
FIG. 8 is a side elevation, in section, of a lead-acid cell manifesting aspects of the invention, taken at the same general position as FIG. 3, illustrating the cell plate assembly held in suspension by a moss shield and a bottom support, spaced away from the cell jar walls, with a negative plate being fully exposed to view.

Referring specifically to FIGS. 3 and 8, positive plates 46 and negative plates 48 are retained within case 40 between two generally planar plate supporting means defined respectively by a "bottom support" 72 and a moss shield 70. The "bottom support" support 72 is so-named in view of the proximity of support 72 to the closed end of jar 42. In many conventional recombinant cells, the jar, cover and plates are configured, in an orientation rotated 90 degrees from that of the preferred orientation of the invention as illustrated in FIGS. 3 and 8. In such case, the wall of the jar at the closed jar end, which wall is denoted 45 in FIGS. 3 and 8 (and also in FIG. 17) acts as the bottom of the jar and supports the entire weight of the cell since the cell rests on jar wall 45. As a result, jar wall 45 is conventionally referred to as the "bottom" and in view of the proximity of support 72 thereto, support 72 has been denominated as a "bottom" support. However, as is clearly evident from the drawings, in the preferred orientation of a cell embodying the plate suspension system aspects of the invention, "bottom support" 72 is not at the bottom of the cell.

Figures 9, 10:
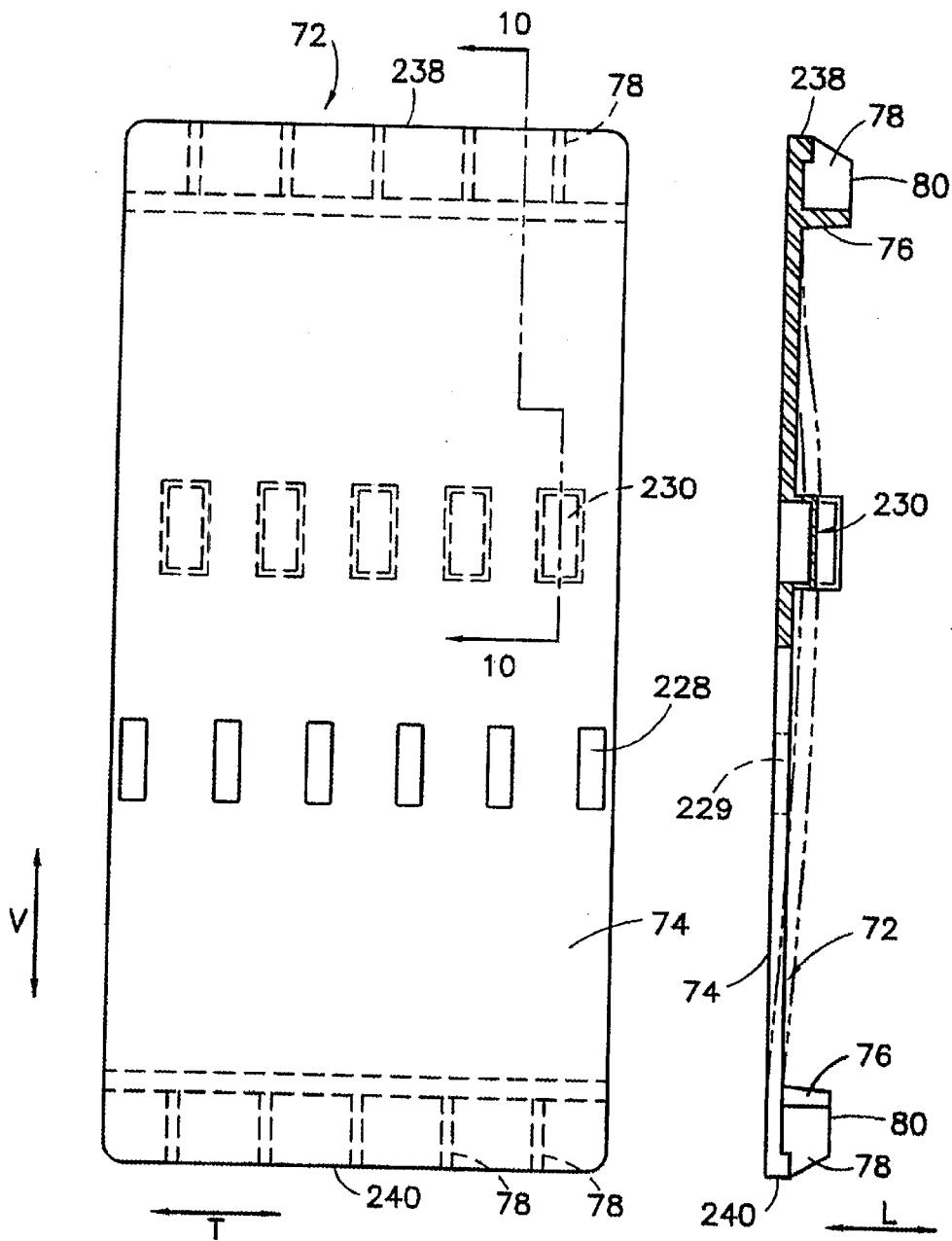
FIG. 9 is a front view of a plate support member from a lead-acid cell manifesting aspects of the invention, as illustrated generally in FIGS. 3 and 8.
FIG. 10 is a side view, partially in section, of the plate support member illustrated in FIG. 9, where the section is taken at lines and arrows 10—10 in FIG. 9.

Bottom support 72 is to the right in FIGS. 3 and 8 and is shown in greater detail in FIGS. 9 and 10. Moss shield 70 is to the left in FIGS. 3 and 8 and is shown in greater detail in FIGS. 11 and 12. Plates 46 and 48 are retained between bottom support 72 and moss shield 70 and are held in position between and respecting moss shield 70 and bottom support 72 by lugs of plates 46 and 48 residing within grooves, openings and cavities in moss shield 70 and bottom support 72.

Figure 13:
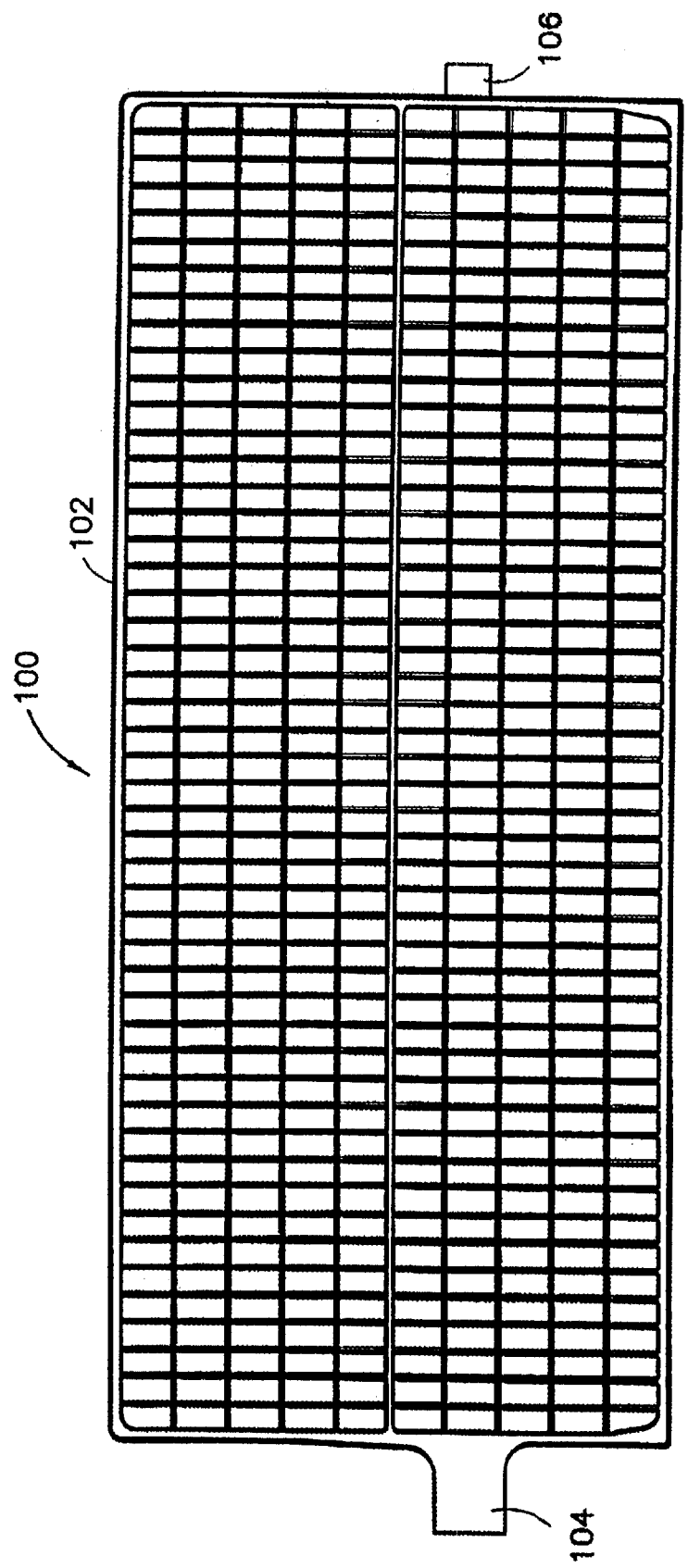
FIG. 13 is an elevation of the grid portion of a negative plate, suitable for use in a lead-acid cell of the type illustrated in FIGS. 1 through 3 and 8, manifesting aspects of the invention.

Positive plates 46 include connecting lugs 92 while negative plates 48 include connecting lugs 104. Connecting lugs 92 and 104 are illustrated as portions of the underlying plate grids which, when pasted with active material, make up the positive and negative plates respectively. The grids are illustrated in FIG. 13 (for the negative plate) and FIG. 14 (for the positive plate). Connecting lugs 92 and 104 are so-denominated because these are the lugs via which positive and negative plates 46, 48 are electrically connected to the cell terminals via which the cell supplies its electrical energy.

Figures 11, 12:
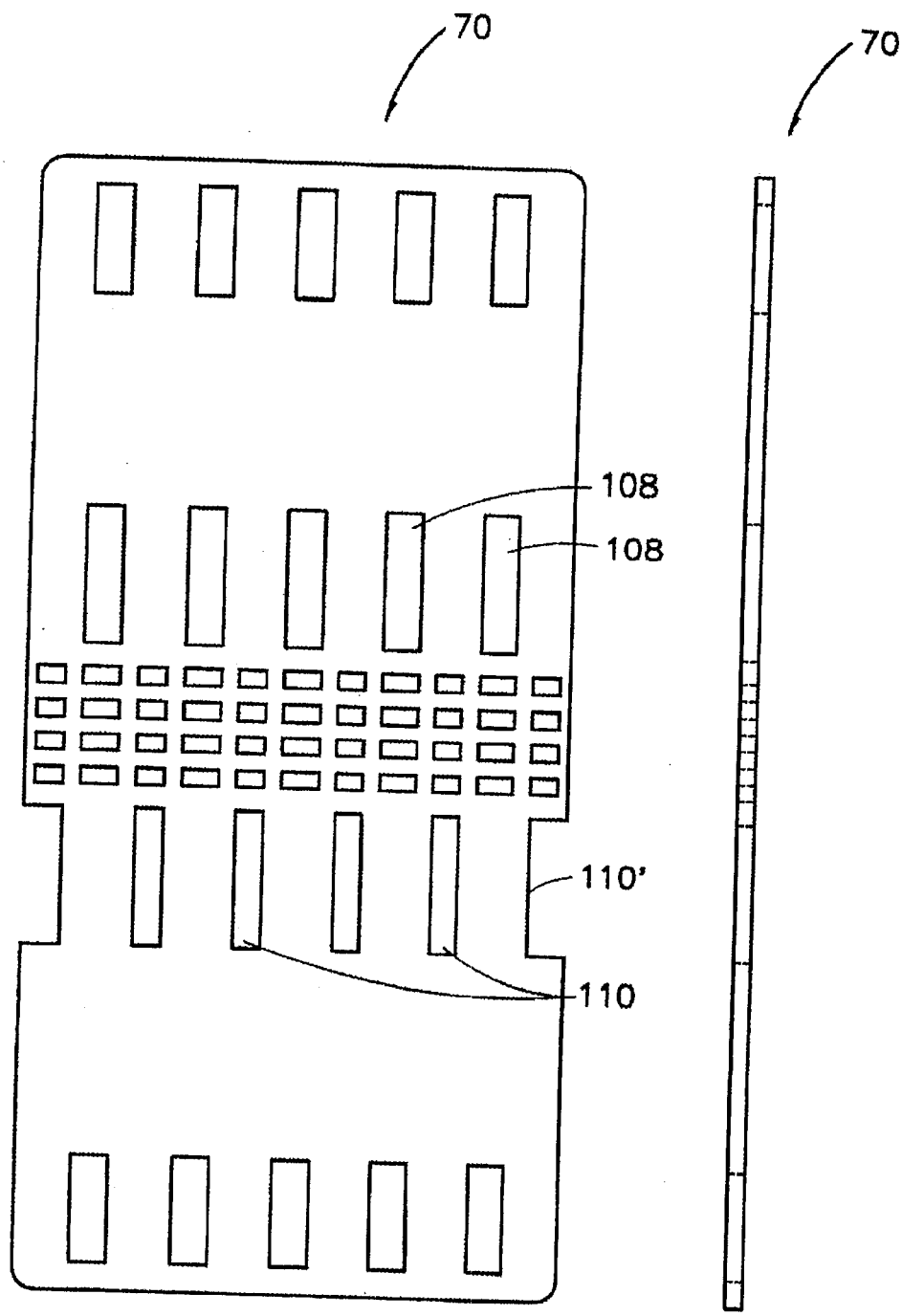
FIG. 11 is a front view of a moss shield of a lead-acid cell manifesting aspects of the invention, as illustrated generally in FIGS. 3 and 8.
FIG. 12 is a side view of the moss shield illustrated in FIG. 11.

Connecting lugs 92 of positive plates 46 fit within and extend through passageways 108 of moss shield 70, illustrated in FIGS. 11 and 12. Similarly, connecting lugs 104 of negative plates 48 fit within and extend through passageways 110 of moss shield 70. Moss shield 70 is sized to fit closely against but slidable with respect to the inner surface of jar 44 as illustrated generally in FIGS. 3 and 8.

Negative plates 48 include support lugs 106 illustrated in FIG. 13; support lugs 106 fit in apertures 228 in bottom support 72 illustrated in FIGS. 9 and 10. Positive plates 46 include support lugs 96 extending therefrom; supporting lugs 96 are illustrated as a portion of positive plate grid 88 in FIG. 14. Support lugs 96, 106 are so-denominated since these lugs, when engaging bottom support 72, provide support for positive and negative plates 46, 48 in the vertical direction.

Positive plates 46 are preferably equipped with a plastic boot 66 illustrated in FIGS. 3 and 17. Boot 66 extends along the edge of positive plate 46 remote from the cell terminal connections; this edge is the vertically extending right-hand edge in FIGS. 3 and 17.

Boot 66 fits closely about not only the edge of positive plate 46 but also support lug 96 of positive plate 46 found at the plate edge. A portion of boot 66 formed for close complemental fitting about support lug 96 of positive plate 46 is denoted 112 in the drawings. Booted support lug 96 resides in a closed bottom receptacle 230 formed in bottom support 72. Receptacle 230 is visible in FIGS. 3 and 17 and is best shown with its closed bottom in FIGS. 9 and 10.

Similarly to moss shield 70, bottom support 72 fits closely within, but slidable with respect to the inner surfaces of jar 44. Bottom support 72 retains positive plates 46 and negative plates 48 in an essentially fixed position as a result of respective support lugs 96 and 106 fitting within closed bottom receptacle 230 and apertures 228 respectively.

The aspect of the invention permitting substantial positive plate growth in the direction of maximum plate growth, namely them longitudinal direction denoted by double-ended arrow L in FIGS. 3, 8, 10 and 14, while maintaining the plates in non-contacting suspension respecting each other (and in non-contacting suspension vis-a-vis the cell jar respecting the direction of maximum plate growth and a second direction of plate growth which is significant but less than the growth in the maximum growth direction) is best illustrated by comparing the positive plate suspension structure of the invention with that of conventional recombinant lead-acid cells.

FIG. 15, depicted adjacent to FIG. 17 for purposes of contrast, depicts a conventional lead-acid cell having a positive plate equipped with a thermoplastic boot. The jar portion of a conventional lead-acid cell has been designated 232. The conventional lead-acid cell includes a plurality of positive plates 234 having thermoplastic boots 236 fitting around the right-hand vertically extending edge of positive plate 234 illustrated in FIG. 15. Positive plate 234 and thermoplastic boot 236 are close to the right-hand side of jar 232; no support means is provided and plate 234, upon longitudinal growth, contacts the interior surface of jar wall 232. Upon such contact, the vertically extending wall of jar 232 may bow outwardly. If the jar wall is sufficiently strong to resist the force created as plate 234 grows, continued plate growth will stress many critical components of the cell, resulting in premature failure.

To be contrasted is the arrangement according to the invention as illustrated in FIGS. 3, 9, 10 and 17. Upon longitudinal growth of positive plate 46, bottom support 72 flexes from the position illustrated in FIGS. 3 and 17 and the position illustrated in FIG. 10 in solid lines, to the position illustrated in FIG. 10 in dotted lines. This flex accommodates longitudinal growth of positive plate, 46 while retaining the sandwich assembly of the positive and negative plates and separator material in an essentially fixed position relative to the jar walls.

While the central portion of bottom support 72 flexes in an amount up to distance indicated by dimensional arrow K in FIG. 17, outboard surfaces 238 and 240 of bottom support 72 remain in sliding, facing contact with respecting inner surfaces of the jar wall. Hence, even though movement of bottom support 72 is permitted in the longitudinal direction, as positive plates 46 grow longitudinally, the sandwiched assembly of the positive and negative plates and separator material wrapped thereabout is retained in a position substantially suspended and spaced away from the cell cover interior surface and from the interior surfaces of vertically extending walls 45 of jar 42.

Bottom support 72 and moss shield 70 engage connecting lugs 92 of positive plates 46 and also engage connecting lugs 104 of negative plates 48 and support lugs 106 of negative plates 48. This effectively provides a bridge-type support for the plate-separator material sandwich assembly respecting the cell cover interior surface and the interior surface of vertically extending wall 45 of jar 42. Preferably, both moss shield 70 and bottom support 72 are insulative plastic.

The plate suspension means, defined in part by moss shield 70 and bottom support 72, positions the plates so that the vertically extending and longitudinally extending plate edges are remote from the interior surfaces of the cell cover and jar, as shown in FIGS. 3, 8, 17 and 20. The relatively fixed positioning is provided by the connecting and support lugs of the positive and negative plate engaging the grooves, apertures and receptacles in moss shield 70 and in bottom support 72, as illustrated in FIGS. 3, 8 and 17.

Space between bottom support 72 and vertically extending wall 45 of jar 42 is an expansion space, best seen in FIGS. 3 and 17, into which the positive plates can grow longitudinally and flex bottom support 72. Positive plate growth in the longitudinal direction is envisioned and allowed for by the design of flexible bottom support 72 and positioning thereof being intentionally spaced away from the adjacent wall 45 of jar 42, as illustrated in FIGS. 3 and 17.

Positive plate growth in the vertical direction indicated by arrow V in FIGS. 3 and 4 is restrained by intermediate members 222 of the positive plate grid, discussed in more detail below. The top and bottom edges of positive plates 46 are maintained sufficiently spaced from the jar wall by the plate suspension means, specifically by moss shield 70 and bottom support 72, to allow for the restrained positive plate growth in the vertical direction denoted by arrow V in FIGS. 3, 8, 9, 14, 18 and 20.

Bottom support 72 includes a generally planar portion 74 which, when cell 12 is assembled, is generally transverse to plates 46 and 48. (Directional arrows V and T in FIG. 9 define the vertical and transverse directions, consistently with the corresponding directions as defined above and as shown in other drawing figures, notably FIGS. 3, 8 and 17.) From the reference provided by directional arrows V and T in FIGS. 3 and 9, the relative position of bottom support 72 whereby planar portion 74 is generally transverse to longitudinally and vertically elongated plates 46, 48, is apparent.

Bottom support 72 further includes a pair of longitudinally extending feet 76 illustrated in FIG. 10. Feet 76 extend over substantially the transverse length of support 72, as indicated by dotted lines in FIG. 9. Bottom support 72 further includes reinforcing webs 78, extending in the vertical direction from feet 76, reinforcing and adding strength to feet 76 over their transverse length. Webs 78 and feet 76 preferably terminate at a common longitudinal extremity, defined by common surface 80, remote from planar portion 74.

Moss shield 70 is illustrated in FIGS. 11 and 12 and is preferably a planar thermoplastic member, preferably fabricated from polypropylene, as is bottom support 72. Moss shield 70 includes apertures 108 receiving connecting lugs 92 of positive plates 46. Moss shield 70 further includes apertures 110 receiving connecting lugs 104 of negative plates 48. Outboard ones of apertures 110 are formed as grooves, rather than apertures. Grooves 110' receive connecting lugs 104 of outboard ones of negative plates 48; there is no need for grooves 110' to be configured as apertures. Moss shield 70 further includes additional, unnumbered apertures through which electrolyte may be introduced into cell 12 during manufacture.

Both moss shield 70 and bottom support 72 are preferably unitary, integral pieces of injection molded plastic, most preferably polypropylene.

When cells 12 are assembled, the respective individual positive plates 46 and individual negative plates 48 are wrapped preferably with respective individual sheets of separator material 50P and 50N, as described in greater detail below respecting the plate wrapping aspects of the invention. Positive plates 46 are then fitted with respective boots 66. Next, a sandwich of positive plates 46 and negative plates 48 is assembled and respective support lugs 96 (covered by complemental portions 112 of boots 66) and 106 of positive plates 46 and negative plates 48 are respectively inserted into receptacles 98 and through apertures 114 of bottom support 72. Next, moss shield 70 is positioned with respective apertures 108 and 110, and grooves 110', receiving connecting lugs 92 and 104 of positive plates 46 and negative plates 48.

The resulting assembly (of positive and negative plates 46, 48, separator material sheets 50P, 50N wrapped around individual plates 46 and 48, boots 66, bottom support 72 and moss shield 70) is inserted into jar 42 in the longitudinal direction indicated by arrow L in FIG. 3. Moss shield 70 and bottom support 72 are both sized to permit such slidable insertion and to act as guards during sliding insertion of the cell plate-sandwich assembly into jar 42. Optionally, a thin polyethylene or other plastic sleeve may be wrapped around the assembly to protect the glass separator material when the sandwich assembly is inserted into the jar.

Moss shield 70 and bottom support 72 are sized so that the external periphery of the sandwich assembly of cell plates 46, 48 and separator material 50P, 50N, when projected in the longitudinal, direction lies within the longitudinal projection of moss shield 70 and bottom support 72. This assures that when the assembly of moss shield 70, bottom support 72, cell plates 46, 48 and separator material sheets 50P, 50N is inserted into cell jar 42, the longitudinally extending edges of plates 46, 48 are spaced away from the inner surface of jar 42. This minimizes the possibility of damage to the sandwich assembly of cell plates 46, 48 and separator material sheets 50P, 50N during insertion into jar 42. This also provides additional expansion space for positive plate growth in the vertical direction of the drawings.

Respecting the matter of space between the positive and negative plates and the interior of jar 42, the growth of positive plate 40 is greatest in the longitudinal direction. Some growth occurs in the vertical direction, as discussed above. Growth in the longitudinal direction is freely permitted and accommodated by the plate suspension system generally described above. Plate growth in the vertical direction is restrained as described in greater detail below respecting the positive plate grid aspect of the invention. Plate growth in the transverse direction, perpendicular to both the longitudinal and vertical directions, is minimal because the thickness of the positive plate, in the transverse direction, is so small relative to the length and height of the positive plate in the longitudinal and vertical directions respectively. The surfaces of the plates facing in the transverse direction, i.e. the surfaces of the plates which are parallel with the plane of the paper in FIGS. 3, 8, 13, 14 and 17, are in compression with such compression being maintained by the jar walls which facingly contact the positive plate/negative plate/separator sandwich assembly once that sandwich assembly is inserted into the jar. This facing contact and compression force is desirably maintained by the compression force maintenance system described above. Hence, the plate suspension system according to the invention spaces the plates, specifically the positive plate/negative plate/separator material sandwich assembly, away from the battery jar and cover interior surfaces in the longitudinal and vertical directions. However, there is facing, indeed, compressive contact between the battery jar interior surfaces and the positive plate/negative plate/separator material assembly in the transverse direction.

Separator Material Plate Wrapping Aspects

An important aspect of this invention is the manner in which separator material is wrapped around the positive and negative plates in a cell.

FIGS. 15 and 16 illustrate the manner in which separator material is wrapped around positive and negative plates in a conventional prior art recombinant cell. In a conventional cell, separator material is wrapped about a plate 234 in a manner shown by a separator material sheet 242 in FIG. 15. Plate 234 may be either positive or negative.

Figure 19:
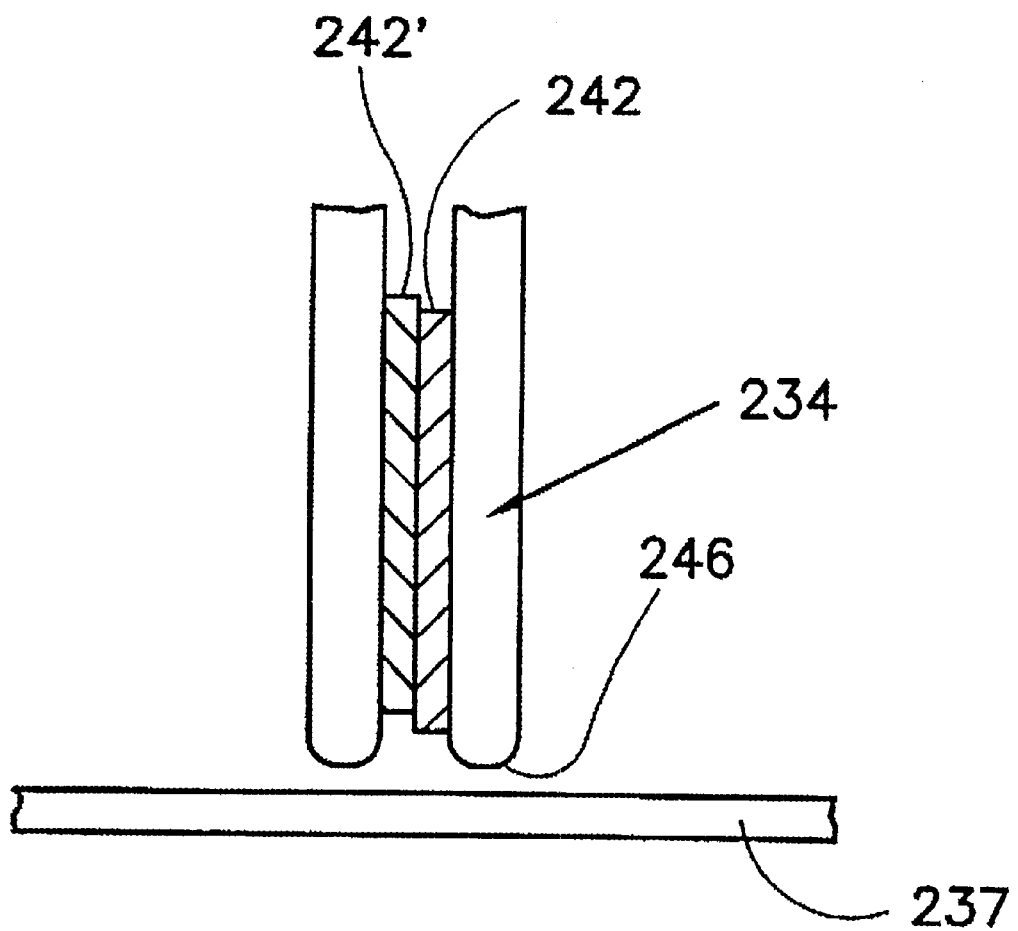
FIG. 19 is a sectional view taken at lines and arrows 19—19 in FIG. 15.

Separator material sheet 242 is wrapped about an edge 235 of plate 234. This leaves longitudinally extending edges 244, 246 of the conventional plate exposed. If conventional plate 234 is a positive plate, leaving edges 244 and 246 exposed leads to potential for shorting, in the event the positive plate grows sufficiently at edge 244 or edge 246 to contact an adjacent negative plate. By the same token, if one of the pieces of separator material 242 wrapped about plate 234 should shift, as depicted in FIG. 19 where two adjacent sheets of separator material 242, 242' are shown vertically displaced relative to one another and relative to the jar wall 247, minimal positive plate growth could result in shorting. Also, dendrite growth from a negative plate, to contacting the positive plate, could result in shorting. The exposed character of plate edge 246 is shown in FIG. 19.

Figure 20:
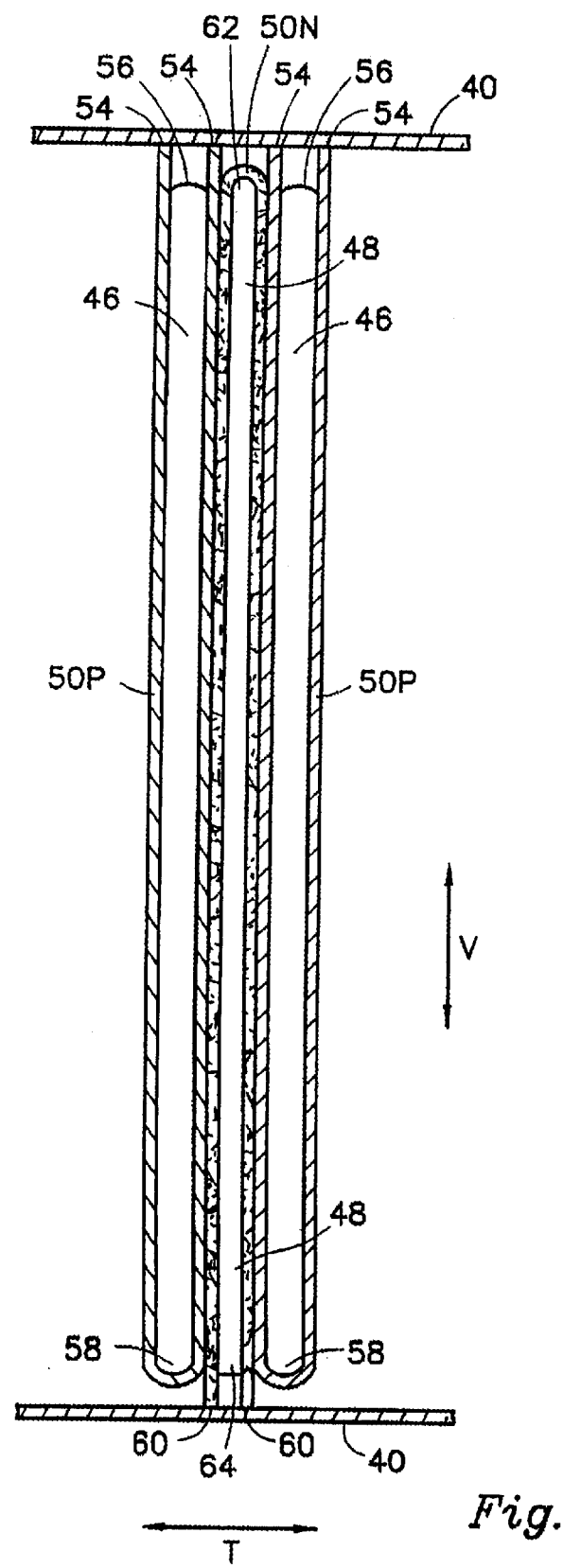
FIG. 20 is a broken sectional view taken at lines and arrows 20—20 in FIG. 3, illustrating the manner in which cell plates are wrapped with separator material in cells embodying aspects of the invention.

Contrasting, in FIGS. 3, 17 and 20, a cell manifesting plate wrapping aspects (and other aspects, namely plate suspension aspects) of the invention is shown partially cut-away, in section. In the invention, as illustrated in FIGS. 3, 17, and 18 and in detail in FIG. 20, both the positive and negative plates are wrapped preferably with sheets of separator material 50P, 50N, with the sheets of separator material folded about longitudinally extending edges 56, 58, 62, 64 of respective positive and negative plates 46, 48.

Each positive plate 46 and each negative plate 48 is preferably individually wrapped in a sheet of absorbent separator material, which is preferably microporous glass mat material. The sheet of separator material wrapped around positive plate 46 is designated generally 50P while the sheet of separator material wrapped about negative plate 48 is designated generally 50N in FIGS. 3 and 20. In FIG. 20 sectioning has been used to depict separator material sheet 50P while stippling has been used to depict separator material sheet 50N; this is to illustrate that each plate, whether positive or negative, is preferably individually wrapped in its own sheet of separator material.

Preferably, sheets 50P and 50N are identical. Plates 46, 48 in cell 12 are wrapped with sheets 50P, 50N of separator material in a manner that two thicknesses of separator material separate each pair of adjacent positive and negative plates from one another. This is illustrated in FIG. 20.

Sheets 50P are wrapped about positive plates 46 so that longitudinally extending edges 54 of separator material sheets 50P terminate proximate common longitudinally extending vertical extremities of positive plates 46 as illustrated in FIG. 20.

In FIG. 20, upper longitudinally extending edges of positive plates 46 are designated 56 while lower longitudinally extending edges of positive plates 46 are designated 58. Longitudinally extending edges of sheet 50N are designated 60, upper longitudinally extending edges of negative plates 48 are designated 62 while lower longitudinally extending edges of negative plates 48 are designated 64 in FIG. 20.

As further illustrated in FIG. 20, sheets 50P of separator material are wrapped about plates 46 by folding sheets 50P around respective lower longitudinally extending edges 58 of plates 46. As a result, lower longitudinally extending edges 58 are enveloped within sheets 50P. With this wrapping configuration of sheets 50P about positive plates 46, of the two longitudinally extending edges 56 and 58 of positive plate 46, at most only upper longitudinally extending edge 56 is exposed.

As a result of this mode of wrapping, two layers of separator material are between adjacent plates. Once the cell plates are compressed, each piece of separator material is compressed to a degree that there is approximately a twenty percent (20%) reduction in thickness. A substantial pressure, in the neighborhood of from about three (3.0) to about five (5.0) psig, is required this compression. The compression force applied to the plates to maintain the plates in intimate contact with the separator material results in the thickness reduction of the separator material when in place between the plates.

Negative plates 48 are wrapped in a similar manner but with separator sheets 50N folded over upper longitudinally extending edges 62 of negative plates 48. As a result, only lower longitudinally extending edges 64 of negative plates 48 are exposed. With this configuration, as illustrated in FIG. 20, the exposed longitudinally extending edges of positive plates 46 are the upper longitudinally extending edges 56, which are remote from the only exposed longitudinally extending edges of negative plates 48, namely lower edges 64. This separation of respective exposed longitudinally extending edges 56, 64 of respective adjacent positive and negative plates 46, 48 effectively minimizes danger of plate growth-induced shorting between positive and negative plates 46, 48 at respective adjacent longitudinally extending edges 56, 62 and 58, 64, as positive plates 46 grow during cell life.

As discussed above and shown in the drawings, particularly FIGS. 3 and 17, positive plates 46 are preferably equipped with plastic insulative boots 66 fitting about vertically extending positive plate edges 68. Sheets 50P of separator material preferably overlie boots 66. Boots 66 on positive plates 46 (in conjunction with sheets 50P and 50N wrapped about plates 46, 48) help to further minimize the possibility of shorting between positive and negative plates at the vertically extending edges of plates 46, 48 remote from terminals 34, 36 and close to jar wall 45.

In addition to positive plate growth and the problems presented thereby, there can be another type of growth at the negative plate, which presents its own set of problems.

In lead-acid cells lead dendrites often grow from the negative plate, especially in the presence of free electrolyte. (Such free electrolyte may be present or may form as a result of the vacuum within the cell. If free electrolyte forms, it collects at the cell bottom.)

In the prior art as illustrated in FIGS. 15, 16 and 19, since the plate wrapping is at a ninety (90) degree angle relative to the wrapping according to the invention, there is no protective wrap of separator material around the bottom edge of the positive plate. Hence there is ample opportunity for dendrite-caused shorting at the bottom edges of the plate.

This is to be contrasted to the manner in which plates 46, 48 of cells 12 are wrapped with separator material, as best shown in FIG. 20. Bottom longitudinally extending edges 58 of positive plates 46 are wrapped in separator material and hence protected from contact by dendrites which might grow from negative plates 48, especially at lower longitudinally extending exposed edge 64, due to the presence of any free electrolyte collecting at the bottom of cell 12.

Long Life Positive Plate and Plate Grid Aspects

Figure 14:
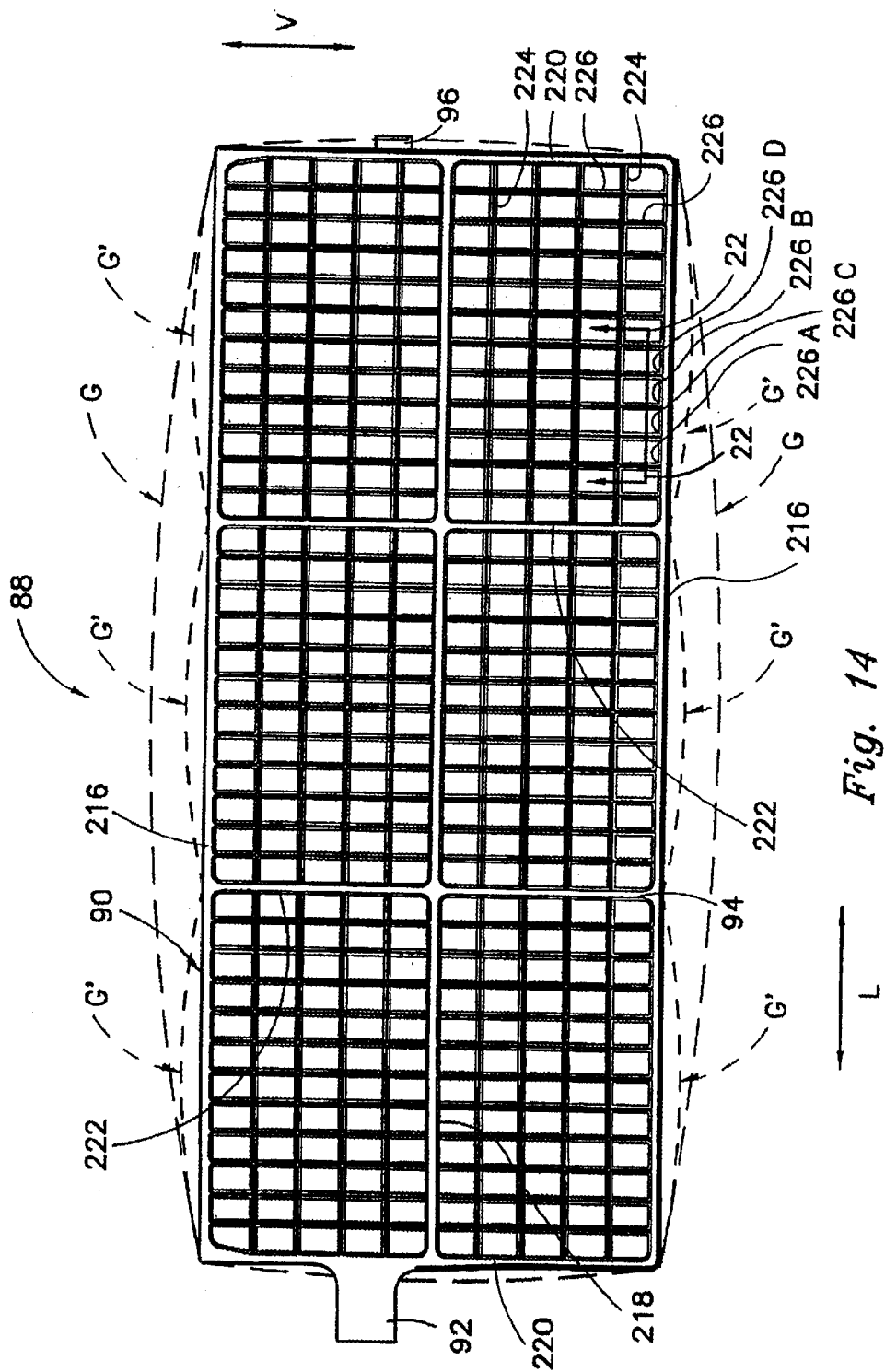
FIG. 14 is an elevation of the grid of a positive plate, suitable for use in a lead-acid cell of the type illustrated in FIGS. 1 through 3 and 8, manifesting aspects of the invention.

Another important aspect of this invention is the geometry of the positive plate lead metal grid on which a positive plate is fabricated by pasting with active material. A preferred embodiment of the positive plate grid is illustrated in FIG. 14 and is designated generally 88.

Cell life is essentially a function of the time to failure of the positive plate grid. Empirical tests show and the battery industry accepts 5% growth of the positive plate grid as marking the end of cell life. Accepted empirical data shows that upon plate growth of 5% (of original plate size) battery capacity drops from rated capacity to about 80% thereof. Eighty percent of rated capacity is accepted in the lead-acid battery industry as denoting end of battery useful life.

The positive plate grid manifesting the grid growth aspects of the invention includes at least one and preferably a plurality of intermediate members, of cross-section substantially larger than elongated members preferably defining a lattice for holding the paste of active material. The intermediate members are preferably of cross-section closer to circular than are the elongated members and preferably extend between outer peripheral members generally defining the outer frame of the positive plate grid.

In designing the grid manifesting grid growth aspects of the invention, a trade-off is made between the number of intermediate grid members and the amount of active material provided. For a given size grid, occupying a relatively fixed area of preselected dimensions, the more intermediate members provided, the less active material can be accommodated. The more intermediate members provided, the more restraint there is on positive plate growth thereby resulting in a longer life cell. However, more intermediate members mean reduced amounts of active material which, in turn, means less battery capacity and higher cost.

In lead-acid batteries, the lead oxidation or corrosion process proceeds principally at the surface of a given member. (In this context the terms "oxidation" and "corrosion" are used interchangeably.) The interior structure of a member is not affected as much by oxidation or corrosion as is the member surface. Since corrosion proceeds principally at the surface and since the corrosion results in an increased volume of material wherever the corrosion takes place, a corroding member surface grows relative to the interior. Hence the interior portion exerts a restraining effect on the growth of the member taken as a whole. These principles have been exploited in the grid growth aspect of this invention.

Grid 88 includes an outer peripheral member 90, generally defining a frame for the grid, and a connecting lug 92 formed as an integral extension of outer peripheral member 90. Grid 88 includes at least one intermediate member, designated 94 in FIG. 14, extending generally between spaced apart parallel portions of outer peripheral member 90.

Intermediate member 94, extending between spaced apart but preferably parallel portions of outer peripheral member 90, substantially divides grid 88 into at least two sections for application of active material paste thereto.

In the preferred embodiment outer peripheral member 90 includes two longitudinally extending outer rails 216, a central longitudinally extending rail 218 defining an intermediate member, two outer vertical rails 220 and two inner vertically extending rails 222 defining intermediate members 94.

Grid 88 further additionally includes longitudinally extending elongated paste support members 224 and vertically extending elongated paste support members 226. Longitudinally and vertically extending elongated paste support members 224, 226 intersect, preferably at right angles as illustrated in FIG. 14, to form a lattice for supporting active material paste applied to grid 88. In light of the corrosion phenomenon, longitudinally and vertically extending elongated paste support members 224, 226 are both preferably selected to have geometry with relatively minimized ratio of surface area to cross-sectional area. Of course the geometry selected must have the strength required to support the active material paste applied to the lattice defined by members 224, 226. In the preferred embodiment, longitudinally and vertically extending elongated paste support members 224, 226 respectively have diamond and triangular cross-sectional areas of from about 0.01 to about 0.02 square inches.

Inner and outer vertically extending rails 220, 222 are preferably of generally hexagonal cross-section, having cross-sectional area of at least from about 0.03 to at least about 0.04 square inches. Outer and central longitudinal rails 216, 218 are also preferably of generally hexagonal cross-section and have cross-sectional area of at least from about 0.03 to at least about 0.04 square inches.

A preferred relative geometry of intermediate members 94 and elongated paste support members 224, 226 is illustrated schematically in FIG. 21. Sectioned hexagon 94 represents the cross-section of intermediate members 94 in FIG. 14 and the cross-section of rails 216, 218 and 220 in FIG. 14. The sectioned diamond 224 represents the cross-section of longitudinally extending elongated paste support member 224 in FIG. 14. The sectioned triangles 226 represent the cross-sectional shape and relative orientation of two spaced apart but adjacent vertically extending elongated paste support members 226 in FIG. 14. All of the sections illustrated in FIG. 1 are taken transversely to the plane of the paper respecting FIG. 14. The hexagon defining a cross-section of intermediate member 94 has sides equal in length to the sides of the diamond defining the cross-section of elongated paste supporting member 224 and equal in length to the sides of the triangles defining the cross-section of elongated paste support members 226.

The polygonal cross-section of the outer peripheral member 90, intermediate members 94 and the elongated paste support members 224, 226 provides enhanced paste adherence to the grid over that achieved if circular cross-section members are used. While circular cross-section members necessarily result in minimal grid growth (because circular grid members having the smallest possible ratio of surface area to cross-sectional area), a trade-off must be made between minimal grid growth and adequate adherence of the active material paste to the grid. The diamond and triangular shapes of elongated paste support members 224, 226, when those members are arranged in the manner described below and shown in the drawings, provides good adherence between the active material paste and the grid.

Additionally, the polygonal shape of the paste support members and the intermediate members enhances paste flow when paste is applied to the grid. Providing outer peripheral member 90 and intermediate members 94 in hexagonal shape permits outwardly facing surfaces, parallel to the plane of the paper considering FIG. 14, of those members to be flat and parallel with the plane of the grid. This enhances the ability of the grid to accept the active material paste as the paste is wiped on the grid during the manufacturing process.

FIG. 21, in addition to illustrating the cross-sectional shape of the intermediate members 94 and the elongated paste support members 224, 226 in the preferred embodiment of the invention, also illustrates the manner in which the triangular cross-section vertically extending elongated paste support members 226 are offset from one another respecting the plane of positive plate grid 90. The two triangles depicted in FIG. 21 have bases along a common line running through respective lateral vertices of the diamond defining the cross-section of longitudinally extending elongated paste support member 224 and respective lateral vertices of the hexagon defining the cross-section of intermediate members 94.

The offset of alternating ones of vertically extending elongated paste support members 226 defines a set of adjacent paste-holding lattice confinements which are offset from and communicate with one another transversely to the plane of positive plate grid 90. The confinements are quite effective to hold paste to form the plate.

Considering FIGS. 14 and 22, two vertically elongated paste support members 226A and 226B define two lateral boundaries of a past-holding confinement designated generally 300 in FIG. 21. The remaining two boundaries of paste-holding confinement 300 are defined by either longitudinally extending elongated paste support members 224 or by a single elongated paste support member 224 together with a longitudinally extending rail 216. In any event, these members defining the remaining boundaries of transversely open paste-holding lattice confinement 300 are not illustrated in FIG. 22.

Elongated paste support members 226C and 226D define parallel boundaries of a second transversely open paste-holding confinement 302 also illustrated in FIG. 22. As with first paste-holding confinement 300, longitudinally extending elongated paste support members 224 or a rail 216, defining the remaining two lateral boundaries of paste-holding confinement 302 have not been illustrated in FIG. 22 to assure drawing clarity. Paste-holding confinements 300, 302 communicate with each other via the space between immediately adjacent elongated paste support members 226B and 226C. Communication between paste-holding confinements 300, 302 is essentially transverse to grid 88. Also, confinements 300, 302 are offset respecting one another in the longitudinal direction of extension of diamond-shaped elongated paste supporting member 224; this is best seen from FIG. 14.

The preferred hexagonal cross-section of rails 216, 218, 220 and 222, being closer to a circle than respective diamond and triangular cross-sections of paste support members 224, 226, results in rails 216, 218, 220 and 222 having a smaller ratio of surface area to cross-sectional area than elongated diamond and triangle paste support members 224, 226. (A circle defines the shape having minimal ratio of surface area to cross-sectional area.)

Intermediate members 94 strengthen the lattice structure defined by members 224, 226, by serving as tie rods countering the growth forces of the lattice structure in the vertical direction respecting FIG. 14.

If intermediate member(s) 94 were not present, plate growth in the vertical direction would manifest itself as indicated generally by dotted line G in FIG. 14. However, with intermediate member(s) 94 present, positive plate growth in the vertical direction assumes a profile indicated generally by dotted line G' in FIG. 14. This limited growth in the vertical direction results partly from the restraining effect provided by inner vertically extending rails 222 defining intermediate members 94.

Because inner vertically extending rails 222 preferably defining intermediate members 94 have hexagonal cross-sections and have a ratio of surface area to cross-sectional area smaller than that of vertically extending elongated triangular paste support members 226, for a given rate of corrosion more material is created at elongated triangular paste support members 226 than at intermediate members 94. (This is due to the phenomena noted above—corrosion occurs at the surface of a given member and the surface area to cross-sectional area ratio of intermediate members 94 is less than that of elongated triangular paste support members 226.) As corrosion proceeds, at any given time intermediate members 94 have a greater percentage of their cross-sectional areas remaining as lead than do triangular elongated paste support members 226. The same holds true of the outer rails, forming a peripheral frame for the lattice defined by paste support members 224, 226.

Since lead occupies less space than the lead corrosion products, intermediate members 94 do not grow in their direction of elongation as much as triangular elongated paste support members 226 seek to grow in that direction. As a result, growth of grid 88 in the vertical direction in FIG. 14 is constrained by presence of thick (relative to elongated triangular paste support members 226) intermediate members 94. Hence, outer longitudinally extending rails 216 reach only the position illustrated by dotted line G', not the position illustrated by dotted line G.

As illustrated in FIG. 14, there is relatively little positive plate growth at the juncture of intermediate member 94 and outer peripheral member 90, due to the geometry of grid 88 and its associated intermediate members 94 and triangular elongated paste support members 226.

The minimal growth exemplified by dotted line G' in FIG. 14 results from strength of intermediate members 94 due to their enlarged cross-section relative to triangular vertically extending paste support members 226 and their smaller ratio of surface area to cross-sectional area relative to vertically extending triangular paste support members 226.

Growth occurs in the vertical direction considering FIG. 14 due to elongated paste support members 226 lengthening as lead converts to lead dioxide during corrosion. Of course, the elongated paste support members 226 also expand in the other two directions. However, due to the relatively small dimensions and similarly developed restraining forces in these other two directions, growth of elongated paste support members 226 in those other two directions is minimal.

Grid growth in the longitudinal direction respecting FIG. 14 is accommodated by the plate suspension aspects of the invention, noted above.

When grid 88 is pasted with active material, connecting lug 92 and support lug 96 protrude from the grid, which is otherwise essentially covered with the active material paste.

Reduced growth of the positive plate enhances maintenance of contact between the pasted active material and the positive plate grid. This contributes to long life of recombinant cells manifesting the grid geometry aspect of the invention.

The grid which is pasted to form negative plate 48 is designated generally 100 in FIG. 13 and, similarly to positive plate grid 88, includes an outer peripheral member 102. Grid 100 further includes a connecting lug 104 and a support lug 106. Connecting lug 104 and support lug 106 are both integrally formed with outer peripheral member 102 and extend outwardly therefrom as illustrated in FIG. 13. Negative plate grid 100 does not require any structure analogous to intermediate member 94 of positive grid 88 because the negative plate does not grow through corrosion during battery life.

Respecting positive plate grid 90, a sufficient number of intermediate members 94 is used to limit grid growth to about 5% over the cell design life.

Typically, the ratio of pasted active material to grid lead metal alloy in the finished positive plate is about 1.5 to 1.0.

In the preferred embodiment of the invention, positive plate grid 90 is about 19 inches in overall length, from left to right in FIG. 14. This results in the sub-lattices defined by intermediate members 94, 218 being about 6 inches in maximum length. This structure has a predicted cell life of 20 years with positive plate growth of 5% or less over such lifetime. This is based on tests where cell life has been simulated by increasing the temperature to accelerate the corrosion process.

It is desirable to avoid an unduly thick grid. For best operation of a cell, the grid should be thin, to produce a thin plate.

Integral Cover Skirt and High Strength Jar-Cover Seal Aspects of the Invention

Another aspect of the invention lies in the structure and manner by which the cell case jar 42 and cover 44 are secured together. Jar 42, as illustrated in FIG. 3 in section and in FIG. 5, generally has the configuration of a hollow parallelepiped with one side open. The open side of parallelepiped-shaped jar 42 is defined by cell cover 44. Jar 42 and cover 44 are preferably both thermoplastic material and may be joined by a suitable thermal weldment or by cement.

Figure 23:
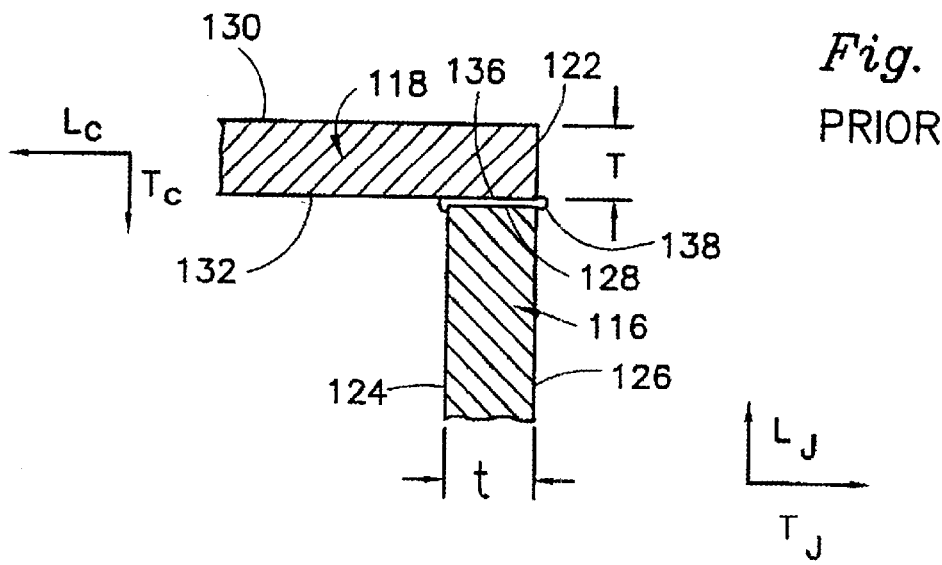
FIG. 23 is a broken sectional view of a cell jar-cover joint or seal thermally bonded according to the prior art.
Figure 24:
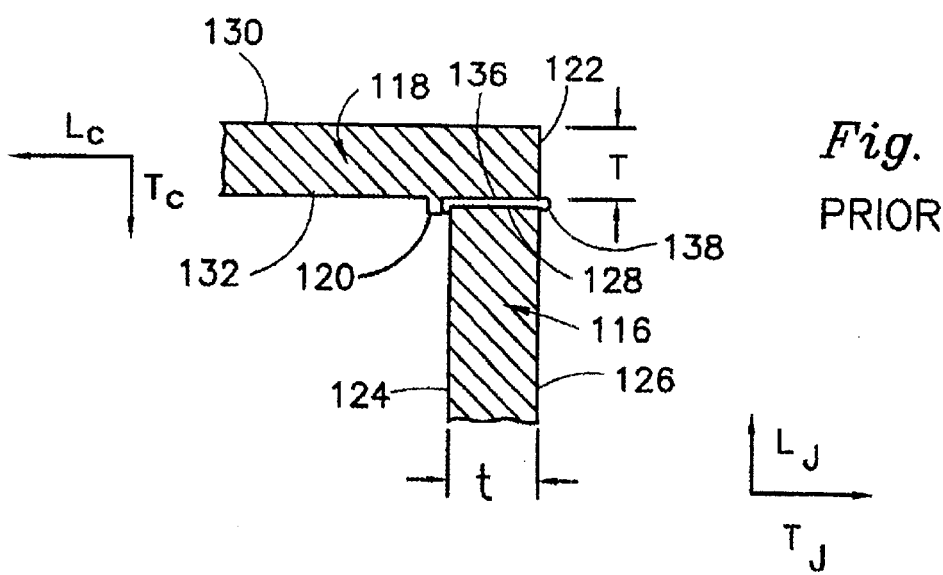
FIG. 24 is a broken sectional view of another cell jar-cover joint or seal thermally bonded according to the prior art.

FIGS. 23 and 24 illustrate prior art assemblies of a cell jar and cell case cover joined by thermal welding. In FIGS. 23 and 24, a wall portion of a conventional cell jar is designated generally 116 and an edge portion of a conventional cell case cover is designated generally 118. Cover edge portion 118 may optionally include a dam 120 preferably extending generally transversely from cover edge portion 118, generally parallel with wall 116, as shown in FIG. 24.

In the conventional construction illustrated in FIG. 24, dam 120 is displaced from a lateral extremity surface 122 of cover edge portion 118 a distance greater than the thickness of wall 116, indicated by dimension "t" in FIG. 24. Wall 116 is preferably fabricated with respective inwardly and outwardly facing surfaces 124, 126 parallel, i.e. wall 116 is of substantially constant thickness and is not tapered. Wall 116 is fabricated with a longitudinally extreme (relative to jar 42) transverse surface 128 generally perpendicular to surfaces 124 and 126. Transverse surface 128 is configured for complemental, abutting contact with cover edge portion 118.

Cover edge portion 118 is fabricated to have thickness indicated by dimension "T" in FIGS. 23 and 24. Thickness "T" of cover edge portion 118 and thickness "t" wall 116 are conventionally substantially equal.

Similarly to wall portion 116, cover edge portion 118 has an outwardly facing surface 130 and an inwardly facing surface 132. A longitudinal extremity (relative to cover 44, not relative to cell 12 or jar 42) of cover edge portion 118 is defined by transverse surface 122. Dam 120, extending generally transversely from cover edge portion 118 in a direction towards wall 116, divides inwardly facing surface 132 of cover edge portion 118 into two portions. The portion of surface 132 between dam 120 and transversely extending longitudinal extremity surface 122 is designated 136 in FIG. 24. Dam 120 to resist molten thermoplastic material flow in the event too much weld material oozes out of the jar-cover joint when the jar and cover are pushed together to effectuate the joint.

For purposes of reference in FIGS. 23 and 24, both jar wall portion 116 and cover edge portion 118 have been labeled with arrows L and T, where these arrows designate the longitudinal and transverse directions with respect to jar wall portion 116 and with respect to cover edge portion 118. Jar wall 116 and cover edge 118 each have an associated directional arrow L and an associated directional arrow T, with appropriate subscripts "c" and "j" denoting arrows L and T associated with the jar wall 116 and cover edge 118 respectively. Directional arrow $L_j$ for jar wall portion 116 is perpendicular to directional arrow $L_c$ for cover edge portion 118. Directional arrow $T_j$ for jar wall portion 116 is perpendicular to directional arrow $T_c$ for cover edge portion 118. Hence, directional arrows L and T respectively denote separate longitudinal and transverse directions with respect to jar wall portion 116 and with respect to cover edge portion 118.

These separate longitudinal and transverse directions defined for jar portion 116 and for cover edge portion 118 are not necessarily coincident or consistent with the longitudinal and transverse directions discussed above with respect to the cell manifesting aspects of the invention, as shown by similarly labeled arrows in other drawing figures, notably FIGS. 3, 8, 9, 10, 14, 17 and 20.

In a conventional cell jar-cover joint, surface 136 is constructed to extend in the longitudinal direction respecting cover edge portion 118 substantially the transverse thickness "t" of wall portion 116. As a result, when wall portion 116 and cover edge portion 118 are joined as illustrated in FIGS. 23 and 24, transverse surface 122 of cover edge portion 118 is substantially co-planar and coincident with outwardly facing surface 126 of wall portion 116.

With this configuration, when wall portion 116 and cover edge portion 118 are joined, joining takes place almost entirely at complementally facing surfaces 136 (of cover edge portion 118) and 128 (of wall portion 116). There is a small amount of joining that occurs between the portion of surface 124 that faces dam 120 and the surface of dam 120 so-contacted by molten plastic material escaping from between surfaces 128 and 136. However, the majority of joining occurs between surfaces 128 and 136, where these surfaces meet. The melted and re-frozen thermoplastic material, which comes from material supplied by both jar wall portion 116 and cover edge portion 118, is illustrated substantially between facing surfaces 128, 136 in FIGS. 23 and 24, but has not been numbered, to assure drawing clarity.

Figure 25:
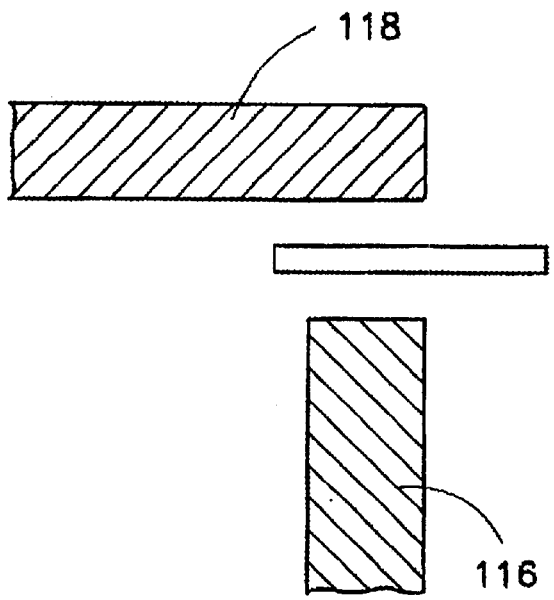
FIGS. 25 through 27 are schematic views illustrating steps involved in thermally welding a cell jar and cover together according to the prior art.

Conventionally, when a cell jar and cover are joined by thermal welding, the cover edge portion and the wall portion of the jar are positioned as illustrated in FIG. 25. Heat is then applied to the parts of the cover and the wall which are illustrated in FIGS. 23 and 24. The heat is typically applied by contacting the respective facing surfaces of the cover edge portion and the jar wall portion with a heated platen. Such a platen has been illustrated schematically in FIGS. 25 through 27, but has not been numbered to aid drawing clarity.

When the heat is applied and the thermoplastic material typically constituting the cover and the wall illustrated in FIGS. 23 and 24 has softened, force is applied to urge the cover and the wall together. The force is applied in the direction indicated generally by double-ended arrow F in FIG. 27.

Application of such force causes the softened thermoplastic material of the respective parts to be thermally welded with the two part melding together at facing surfaces 128 and 136 and thereby forming an integral joint between the cell case cover and wall as illustrated in FIGS. 21 and 22. Urging the cell cover and jar towards one another in the direction indicated by arrow F in FIG. 27 results in a nipple of soft thermoplastic material oozing from between joined surfaces 128, 136. This nipple is designated 138 in FIGS. 23 and 24. As the final step in fabrication of a conventional cell case, once nipple 138 has cooled and hardened it is preferably removed to leave a flat, smooth surface at the exterior of the joined cell jar and cover.

Figure 28:
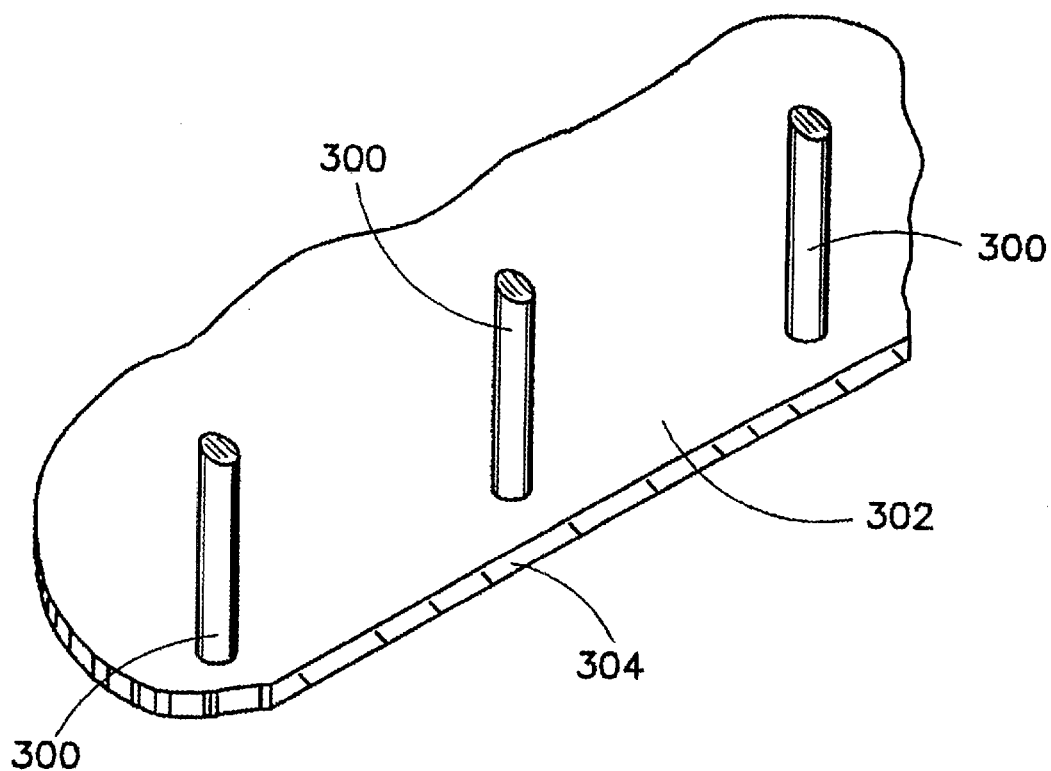
FIG. 28 is a broken isometric view of a cell cover including guide pins according to the prior art.

The cover may be equipped with guide pins defining an envelope smaller than the inner periphery of the jar, to guide the cover into place against the jar wall when the jar-cover joint or seal is to be effectuated. (Guide pins are not shown in FIGS. 21 through 25 to avoid drawing clutter.) Typical guide pins representative of the prior art are illustrated as 300, extending from a cell case cover 302 in FIG. 28. Typically, the guide pins are located slightly inboard of an edge 304 of cover 302 and have ends canted towards edge 304 to assist in guiding the cover into place in contact with the jar.

Figure 29:
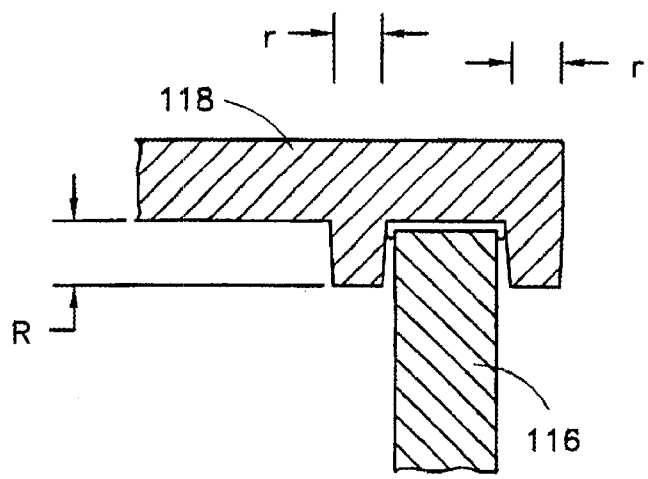
FIG. 29 is a broken sectional view illustrating a cell jar-cover tongue and groove-type construction, with the jar-cover joint or seal effectuated using cement, according to the prior art.

In addition to thermal bonds shown in FIGS. 23 and 24, it is also known to use a tongue and groove construction between the cell jar and cover, with cement securing the jar and cover together. A typical prior art tongue and groove construction is illustrated in FIG. 29. Cement is typically applied to the groove, which is formed in the cover when the cover is molded. The jar wall, which defines the tongue, is then forced into the groove and contacts the cement in the groove, effectuating the jar-cover seal when the cement hardens.

Figure 30:
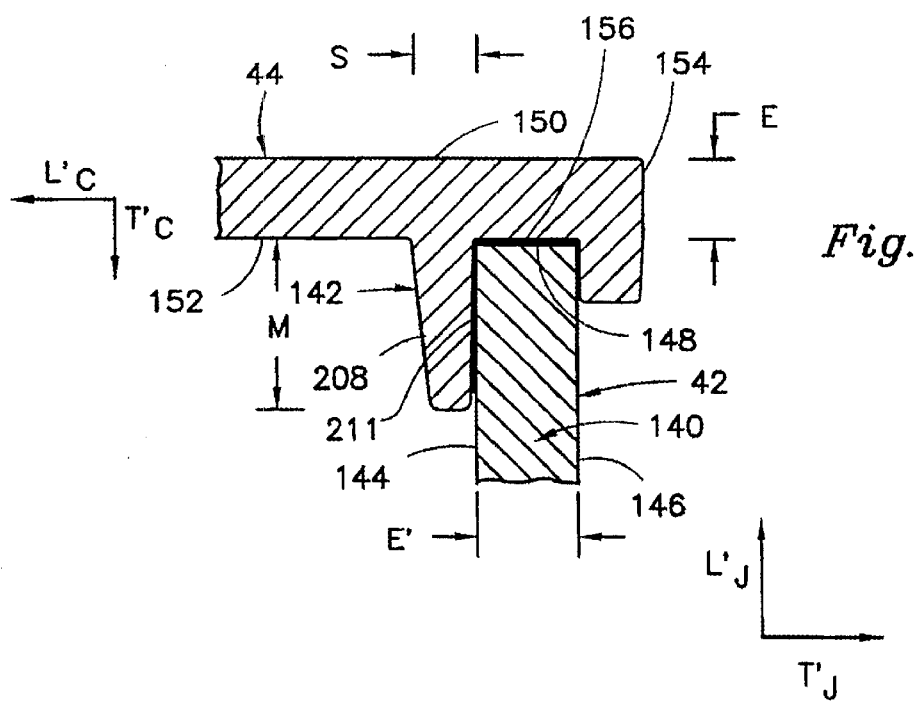
FIG. 30 is a broken sectional view of a cell jar-cover tongue and groove-type construction according to the invention, where the jar-cover joint or seal is effectuated using cement.
Figure 31:
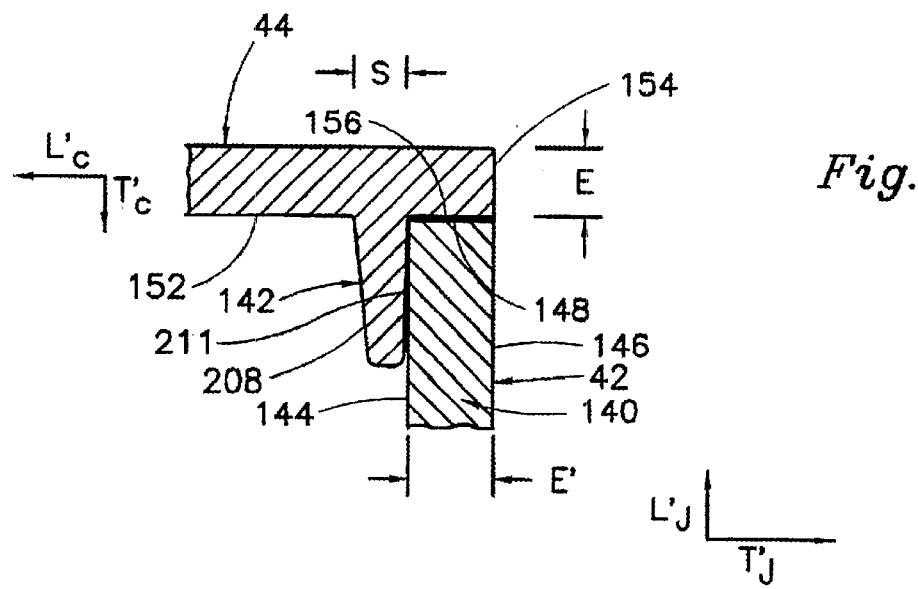
FIG. 31 is a broken sectional view of a cell jar-cover joint or seal effectuated using heat and manifesting aspects of the invention.
Figure 32:
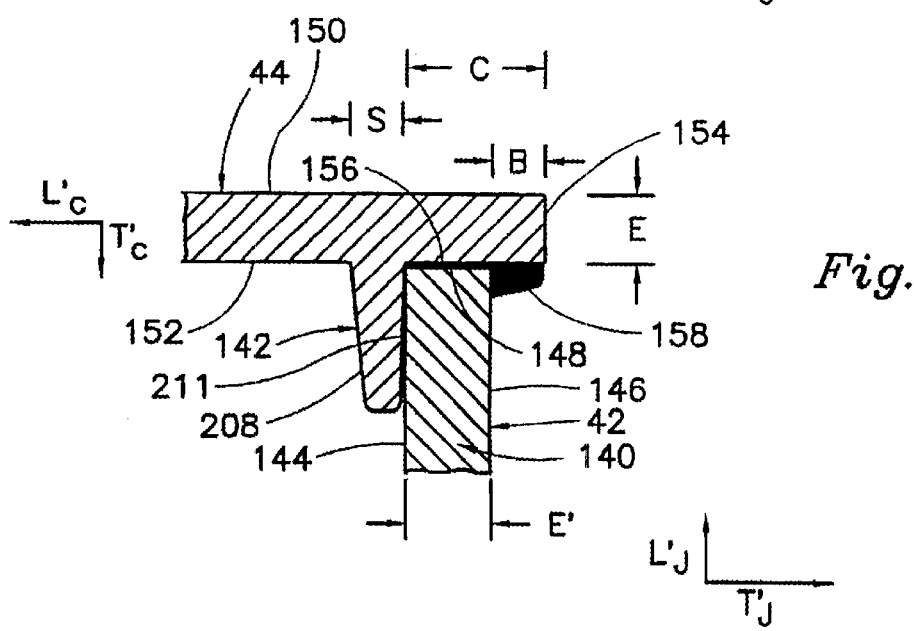
FIG. 32 is a broken sectional view of another cell jar-cover joint or seal effectuated using heat and manifesting aspects of the invention.

In contrast to the prior art construction illustrated in FIGS. 23 through 29, a configuration of a wall portion 140 of jar 42 and a portion of cover 44 are illustrated according to aspects of the invention in FIGS. 30 through 32. In FIGS. 30 through 32, jar wall 140 and cover 44 have been given two axis coordinate systems as indicated by arrows L' and T' respecting both jar wall 140 and cover 44. L' denotes the longitudinal direction and T' denotes the transverse direction respecting an associated jar wall 140 or cover 44. Similarly to the directional arrows provided in FIGS. 3 and 24, arrows L' and T' in FIGS. 30–32 include appropriate subscripts "c" and "j" denoting those arrows L' and T' which are respectively associated with cover 44 and jar 42 of case 40.

In the construction according to the invention, cover 44 includes reinforcing skirt 142 extending generally transversely from cover 44 in the direction of jar wall portion 140. Jar wall portion 140 has respective inwardly and outwardly facing surfaces 144, 146 and a transverse surface 148 defining a longitudinal extremity of wall portion 140, all as illustrated in FIGS. 30 through 32.

Cover 44 is preferably fabricated to have thickness E while jar wall 140 is preferably fabricated to have thickness E', both as illustrate in FIGS. 30 through 32. Thickness E of cover 44 and thickness E' of wall 140 are preferably substantially equal. Cover 44 has an outwardly facing surface 150, an inwardly facing surface 152, and a transverse surface 154 defining a longitudinal extremity of cover 44 adjacent to wall 140 of battery jar 42.

Skirt 142 divides inwardly facing surface 152 into two portions. The portion of inwardly facing surface 152 which is adjacent to extremity 154 of cover 44 is designated 156 in FIGS. 30 through 32.

Jar wall portion 144 and cover 44 are configured such that surfaces 148 and 156 are in complemental facing contact with one another when cover 42 and wall 144 are in abutting position, perpendicular one to another, as illustrated generally in FIGS. 30 through 32.

In one construction according to the invention, cover 44 is preferably configured to extend outwardly, respecting outwardly facing surface 146 of wall 144, beyond wall surface 146, as shown in FIG. 32. Preferably, cover 44 is configured such that surface 156 extends beyond surface 146 a distance of about one-half the thickness E' of wall 146; this distance is identified by dimension B in FIG. 32.

When cover 44 is to be joined to jar wall 144, the cover and jar wall are positioned facing one another as illustrated in FIGS. 25 and 30 through 32. Next, heat and/or cement is applied to the facing surfaces 148 and 156.

If cement is used to effectuate the jar-cover seal, the tongue and groove configuration illustrated in FIG. 30 is preferred. In such case, a cell jar and cover are preferably polyvinyl chloride.

If heat is to be used to effectuate the jar-cover seal, the battery jar and cover are preferably polypropylene and the cover is of either the configuration illustrated in FIG. 31 or FIG. 32.

In all three configurations of the jar-cover seal embodying the invention illustrated in FIGS. 30 through 32, the skirt is present providing reinforcement for the battery jar wall in the area of the jar-cover seal.

In the tongue and groove configurations according to the prior art, the members defining the groove have typically been of thickness about one-tenth of an inch; this dimension is denoted "r", in FIG. 29. The members defining the groove have typically extended from the cell cover of about two-tenths of an inch; this dimension is denoted "R" in FIG. 29. Typically, the groove has been wider than the jar wall fitting into the groove, providing some "slop" when the jar wall and cover according to the prior art are initially fitted together; in the prior art, a typical groove exceeds thickness of the jar wall by about two-tenths of an inch.

In the jar-cover seal in accordance with the invention, reinforcing skirt 142 is substantially thicker at its base, where it joins with cover 44, than at its extremity remote from cover 44. Preferably, skirt 142 is of thickness of at least about 0.130 inches at its base where it joins cover 44. This is indicated by dimension S in FIG. 30.

Skirt 142 has a surface 211 facing jar wall 140 which is preferably planar and parallel with the corresponding facing surface 144 of jar 140. Inwardly facing surface 208 of skirt 142 preferably tapers at an angle of about 10 degrees respecting the jar wall. Typically, skirt 142 is about one-tenth inch in thickness at its tip remote from cover 44.

Figure 26:
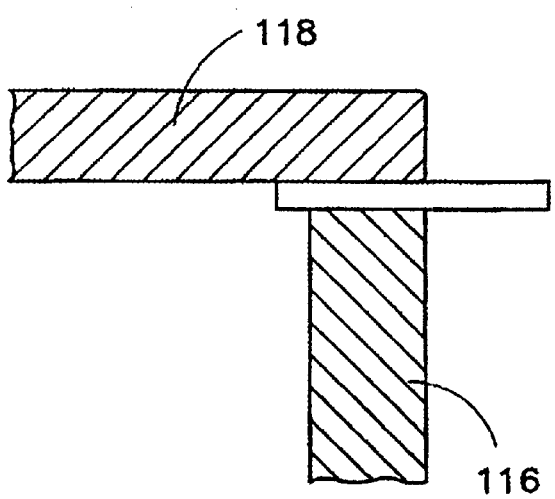
Figure 27:
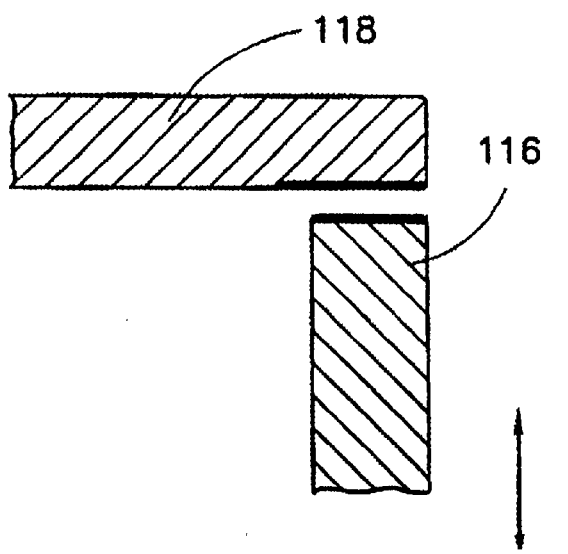

If heat is applied, this may be done in the manner indicated schematically in FIGS. 25 through 27.

Once the proximate portions of the cover and jar wall, both being made of thermoplastic, soften somewhat, force is applied to urge the cover and jar wall towards one another in a direction indicated generally by double-ended arrow F' in FIG. 27. When such force is applied to urge cover 44 and wall 144 towards one another in the direction indicated by double-ended arrow F, the wall typically slightly penetrates the soft, molten thermoplastic of material of the cover. Molten thermoplastic material from the cover and wall blends together between the forced together jar wall and cover. A bead 158 of softened thermoplastic material results, squirting out from between the cover and the jar wall. As illustrated in FIG. 32, bead 158 extends along the portion of surface 156 of cover 44 which protrudes beyond outwardly facing surface 146 of wall 140.

While it is the practice in the prior art to trim any bead protruding from between the jar and cover to the exterior of the cell, in one preferred embodiment of the high strength jar-cover seal of the invention, the bead is left in place to provide greater joint strength-in the area of the jar-cover seal.

With the construction of the invention according to FIG. 32, bonding of cover 44 and wall 140 occurs over the entire length of surface 156, designated generally by dimension C in FIG. 32. Since bonding occurs over a larger area than in prior art designs, generally over about a fifty percent (50%) greater area (since surface 156, prior to bonding of cover 44 to wall portion 140, extends outwardly from surface 146 a distance about one-half the thickness of wall 140), a higher strength joint results and more reliable seal results. Further respecting the construction according to FIG. 32, bonding occurs not only over the entirety of surface 156 of cover 44, but also along the portion of exterior surface 146 of jar 42 contacted by bead 158. Hence, the area of the jar contacted by the joining bead 158 is higher than in prior art designs, as is the area of cover 44 contacted by the joining bead 158.

Inboard skirt 142 in FIGS. 30 through 32 substantially contacts and fully supports the peripheral wall of the jar in the vicinity of the jar-cover joint or seal. Skirt 142 provides structural reinforcement for the jar wall, helping the jar-cover seal to resist fracture in response to high suction forces needed to fill the cells with electrolyte.

Ordinarily these forces stress the jar-cover joint, potentially damaging the jar-cover seal. However, the structural support of the jar wall (and hence of the jar-cover seal) provided by skirt 142 supports the joint, permitting the seal to be maintained intact through the subsequent cell manufacturing process and the stresses which are unavoidably applied to that joint during manufacture and subsequent service.

Figure 33:
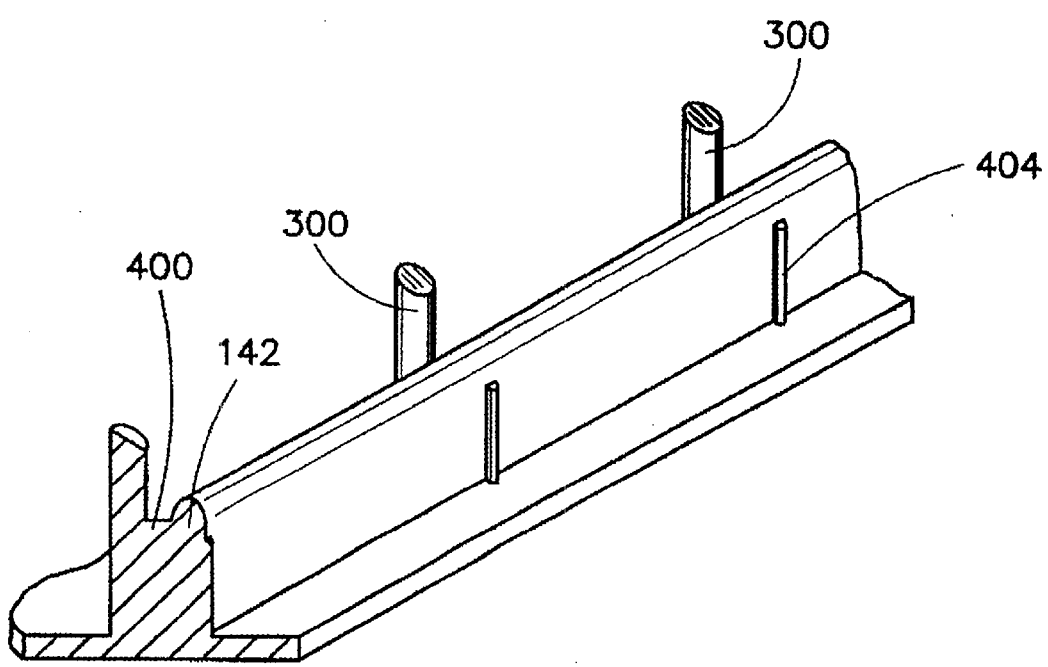
FIG. 33 is a broken isometric view of a cell case cover having a skirt, manifesting aspects of the invention.

Desirably, skirt 142 may be combined with guide pins according to the prior art to produce an even higher strength joint and seal at the jar-cover interface. As illustrated in FIG. 33, skirt 142 can be combined with guide pins 300 located inboard thereof where the guide pins are preferably connected to skirt-cover-jar arrangements 142 via a web 400. The guide post-web combination may be used with any of the skirt arrangements illustrated in FIGS. 30 through 32.

There may optionally be provided ribs 404, shown in FIG. 33, on the surface of skirt 142 facingly contacting the inner surface of the jar. Ribs 404 are desirably provided in respective correspondence to guide pins 300 to provide even greater strength for skirt 142 and correspondingly greater strength when a jar-cover seal is effectuated.

Ribs 404 desirably maintain skirt 142 slightly spaced away from the inner surface of the jar wall, thereby permitting cement, when cement is used to effectuate the jar-cover seal or bond, to flow between the jar wall and the skirt, thereby contributing to an even higher strength bond between the jar wall and the skirt. Such cement flow is indicated by the dark vertical line appearing in FIG. 30 between jar wall 42 and skirt 142 at surface 211. Ribs 404 typically extend from skirt 142 no more than 0.010 inch. Skirt 142 preferably extends from surface 152 at least about 0.4 inches. This is denoted by dimension M in FIG. 30.

In the tongue and groove embodiment of the invention illustrated in FIG. 30, the groove defined in part by skirt 142 is substantially narrower than that used in the prior art and does not allow any significant "slop" between the cover and jar wall. Desirably, only a few thousandths of an inch clearance is provided between the respective outwardly facing surfaces of jar wall 140 and the respective surfaces of cover 44, including surface 211 of skirt 142, defining the groove into which the longitudinal extremity of jar wall 42 fits.

Quick Access Safety Plate Mounting Aspects

Yet another aspect of this invention is the provision of safety plates covering outer surfaces of the modules. The plates are hand-removable, without use of tools, in a matter of seconds. The safety plates are connected to the modules by unitary, universal mounting brackets which can be used on either the left or the right side of a module and on either the top or the bottom of a module. The mounting bracket permits stacking of the modules, with a given bracket releasably engaging safety plates both above and below the bracket. The bracket is flame-retardant, non-conductive plastic, preferably polyvinyl chloride. The safety plates are also flame-retardant, non-conductive plastic, preferably foamed polyvinyl chloride.

The bracket according to the invention permits selective random removal of the safety plates in any order or sequence. This can be important in an emergency. The bracket further facilitates mounting and removing the safety plates by hand, literally in seconds, without use of tools. Installation and removal of the safety plates presents no risk of shock since the mounting bracket, being plastic, is non-conductive.

Figures 34, 35:
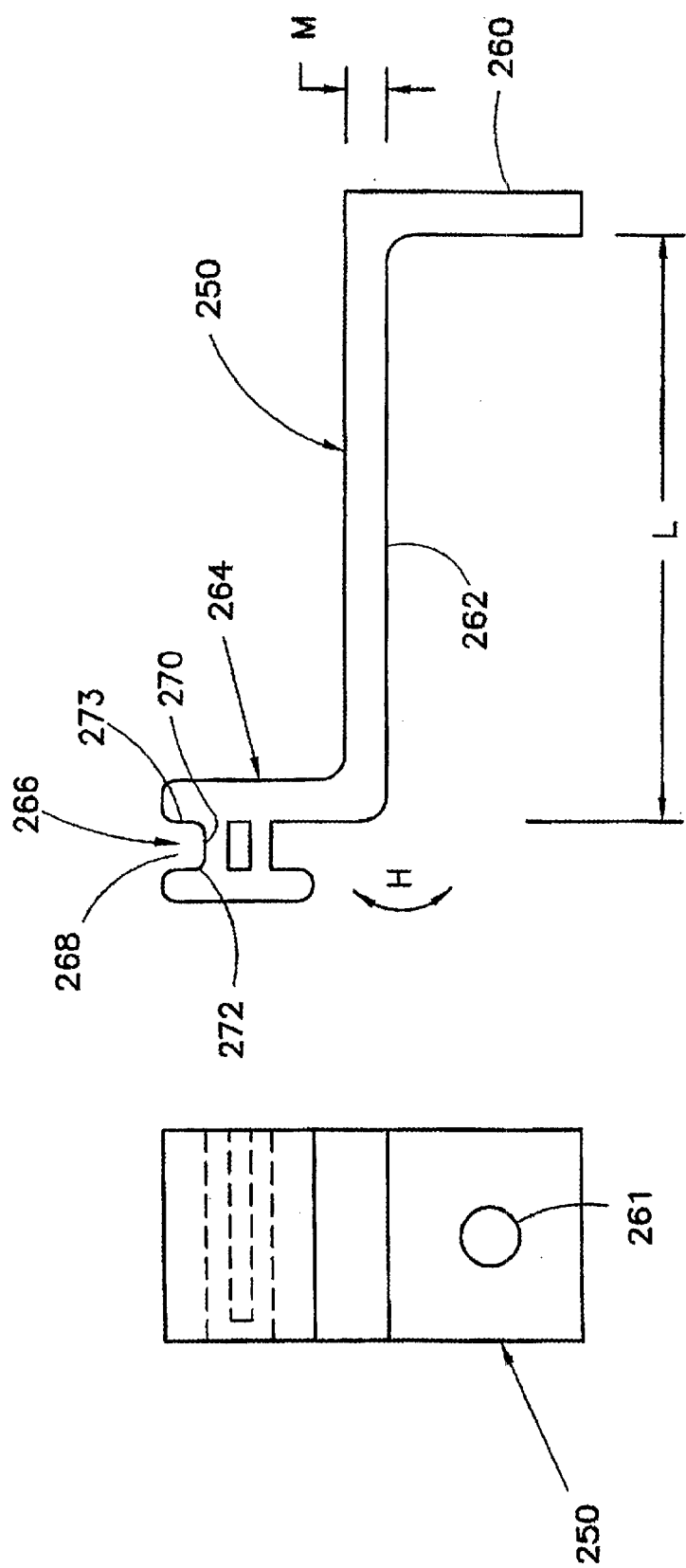
FIG. 34 is a side view of a safety plate or cover suspension member manifesting aspects of the invention.
FIG. 35 is a front view of the safety plate or cover suspension member illustrated in FIG. 34.

A preferred embodiment of the safety plate mounting bracket is illustrated in FIGS. 34 and 35 where it is designated generally 250.

The mounting bracket preferably includes a base 260 which is adapted for mounting on a module, preferably on the web portion 28 and side member 18. Base 260 includes a hole 261 via which bracket 250 can be mounted on a module via suitable screws or other hardware. Mounting bracket 250 further includes a cantilever portion 262 extending in cantilever fashion outwardly from base 260. At the end of cantilever portion 262 are provided means for releasably retaining an edge of a safety plate upon application of manual force to the plate without use of tools. The plate edge retaining means is designated generally 264 in FIGS. 34 and 35.

Plate edge retaining means 264 includes a groove 266 for receiving a safety plate edge.

Figure 36:
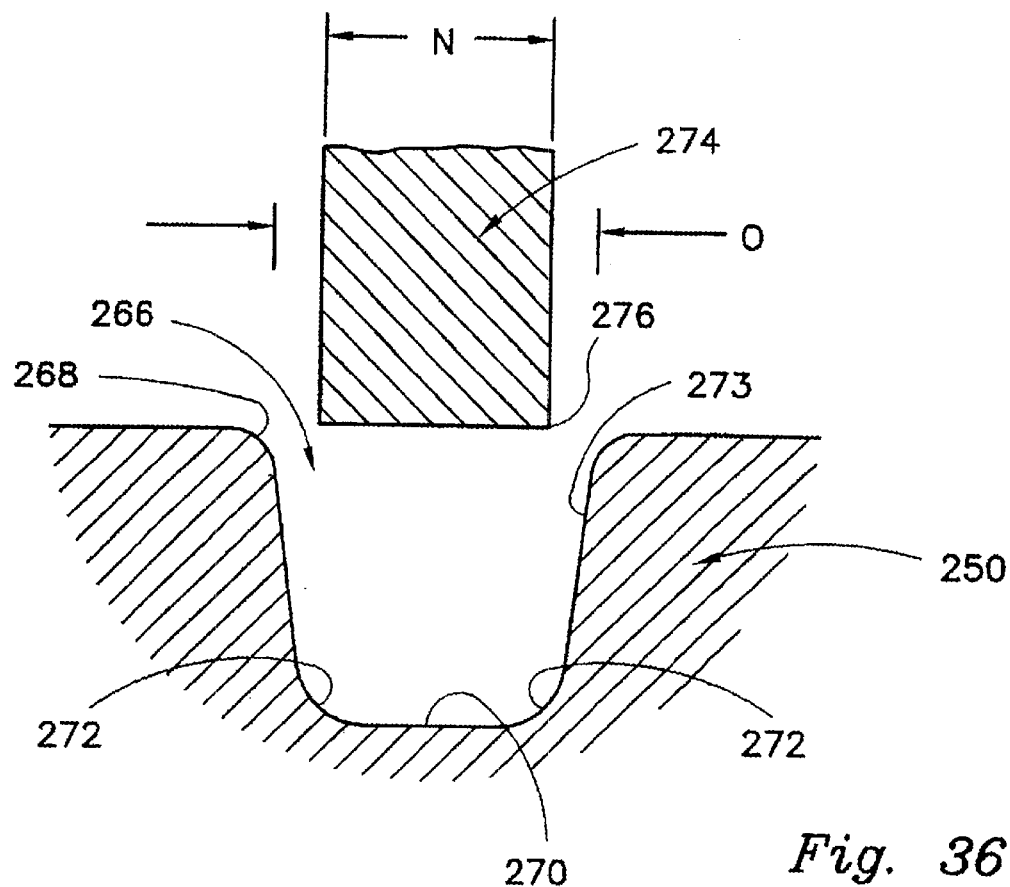
FIG. 36 is a broken schematic sectional view of a battery safety plate or cover and a suspension member, prior to engagement.

Groove 266 has a preferably planar bottom portion 270 and walls 273 which generally taper from a wider mouth 268 to the narrower bottom of the groove. The groove bottom is connected to the groove walls by concavely converging curving portions 272. Curving portions 272 adjoining groove bottom 272 to groove walls 273 are characterized as "concavely" curving in that those portions curve away from and hence are concave with respect to the groove mouth 268. Curving portions 272 are characterized as "converging" because respective curving portions 272 run towards one another from respective groove walls 273 to groove bottom 270. This geometry is best illustrated in FIG. 36.

Bracket 250 is configured and made of appropriate material that the bracket can flex in the direction indicated by arrow H in FIG. 34; in this regard, it is important that the length of bracket 250, denoted L in FIG. 34, be large relative to the thickness of the cantilevered portion, denoted M in FIG. 34, to provide flex in the direction indicated by dimensional arrow H. The flex is important in permitting some tolerance for the operator when manually installing and removing the safety plates from brackets 250.

In the preferred embodiment, dimension L is 3 inches while dimension M is 0.2 inches.

Groove 266 is preferably transverse to cantilever portion 262. The flexible character of cantilevered portion 262 facilitates flexure of the bracket, thereby contributing to the characteristic whereby the safety plates held by the bracket can be rapidly put in place or removed.

Figure 37:
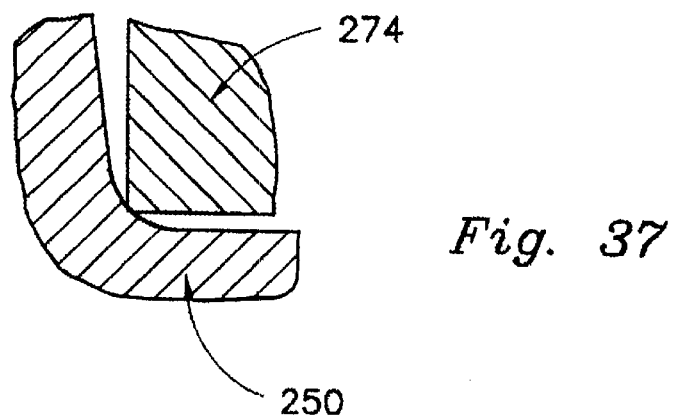
FIG. 37 is a broken sectional view of a battery safety plate or cover and a suspension member, showing the manner in which the safety plate or cover interferingly engages the suspension member.

Groove 266 is preferably sized so that mouth 268 has width greater than thickness of an edge of a safety plate 274, but width of planar bottom portion 270 is less than thickness of safety plate 274. As a result, safety plate 274, which is of generally rectangular configuration, resides within groove 266 with the right angle corners 276 of plate 274 riding against concavely converging curved portions 272 of groove 266. This contact is illustrated best in FIG. 37.

When safety plate 274 is fabricated of the preferred foamed polyvinyl chloride and bracket 250 is fabricated of the preferred polyvinyl chloride, the arrangement illustrated in FIGS. 34 through 37 results in the safety plate being easily hand-releasably retained by the bracket. Specifically, when safety plate 274 is inserted into groove 266, as corners 276 contact curving portions 272, some interference results therebetween as the plate is urged, with slight manual force, towards bottom portion 270 of groove 266. The interface results in corners 276 of cover plate 274 deforming slightly as corners 276 contact curved portions 272. Corners 276 deform slightly because plate 274, preferably being fabricated of foamed PVC is softer than bracket 250, which is injection molded PVC. The curvature 272-corner 276 interference retains safety plate 274 in place until a worker seeks to manually remove the safety plate from engagement with the bracket.

In the preferred embodiment of the invention, the safety plate is 6 millimeters or 0.235 inches thick, as denoted by dimension N in FIG. 36. Groove 266 is preferably slightly more than 0.235 inches wide at the mouth, as indicated by dimension O in FIG. 36. Wall portions 273 of groove 266 preferably taper at an angle of about 5 degrees in connecting groove mouth 268 with concavely convergingly converging portions 272. Convergingly concavely curved portions 272 are preferably formed at a radius of 0.060 inches. Groove 266 is preferably about 0.2 inches deep. When the groove is constructed in this configuration, the safety plates are retained within the groove once the plates are put in position by a worker. The plates may also be easily manually removed by a worker without use of tools, in a matter of seconds.

Bracket 250 has been illustrated with a closed bottom orifice formed in bracket 250 between two grooves 266. This orifice facilitates injection molding of bracket 250 with maintenance of close dimensional tolerances in the area of grooves 266. The closed bottom orifice has not been numbered in the drawings to assure drawing clarity.

Preferably, as illustrated in FIG. 34, bracket 250 includes two grooves 266 disposed parallel and facing oppositely respecting one another. This permits two safety plates 274 to be retained by a single bracket 250, thereby facilitating close spacing of adjacent edges of neighboring safety plates. Close plate spacing permits the outwardly facing surfaces of modules 26 to be closely covered, preventing accidental contact with terminals 34, 36 or electrical connections between cells 12.

While the preferred embodiments of the various aspects of the invention have been described, the scope of protection to which the invention in its many aspects is believed entitled is defined by the claims, and by equivalents thereto which perform substantially the same function in substantially the same way to achieve substantially the same result as set forth in the claims, so long as such substantial equivalents, as defined by hypothetical claims for such substantial equivalents, do not read on the prior art.

We claim:

1. A lead-acid battery comprising:
   a. a plurality of vertically stackable interchangeable cell modules without cells thereof bearing the weight of cells in a higher module, each module comprising:
      i. a plurality of interchangeable lead-acid cells arranged in spaced adjacency to one another in a horizontal row, said cells being individually free-standing and slidably removably replaceable from the front of said battery, each cell comprising:
         (1) a case;
         (2) upstanding planar positive and negative plates within said case, positioned transversely to said row;
      ii. apertured planar rectangular cell support plate means underlying and vertically supporting said cells in said rows, apertures in said support means communicating with space between adjacent cells vertically supported thereby;
      iii. web members upstanding from corners of said rectangular cell support means for supporting and thereby receiving the weight of a vertically higher modules while permitting slidable replacement of individual cells from said front of said battery;
   b. cell support means of a next higher module resting on said web members upstanding from an immediately lower module;
   c. said modules being arranged that respective horizontally positioned cells are vertically aligned so that said space between horizontally adjacent cells defines channels therebetween for cooling air flow through said apertures.

2. The battery of claim 1 further comprising means for adjustably applying compressive force to said cell plates within one of said horizontal rows in a direction transverse to said channels for cooling air flow.

3. A battery comprising:
   a. at least one recombinant lead-acid cell including a compressed together plurality of interleaved positive and negative cell plates with microporous separator material between respective adjacent positive and negative cell plates within a case; and
   b. means for adjustably applying and maintaining compressive force to said cell plates and separator material in a direction perpendicular to said plates by application of said compressive force to said case exterior.

4. The battery of claim 3 further comprising:
   a. a plurality of recombinant lead-acid cells, each including a compressed together plurality of interleaved positive and negative cell plates with microporous separator material between respective adjacent positive and negative cell plates; and wherein
   b. said means for adjustably applying compressive force applies said force to all of said interleaved positive and negative cell plates and separator material therebetween of said plurality of recombinant lead-acid cells.

5. The battery of claim 3 wherein
   a. each of said recombinant lead-acid cells includes a case; and
   b. said means for applying force to said cell plates applies said compressive force exterior of said cases.

6. The battery of claim 3 wherein said means for adjustably applying compressive force is manually actuated.

7. The battery of claim 3 wherein said means for adjustably applying compressive force continuously applies such force to said cell plates.

8. The battery of claim 3 wherein said force is applied perpendicularly to said cell plates.

9. The battery of claim 6 wherein said compressive force application means includes vernier means for applying force selected from a continuum of available force values.

10. The battery of claim 9 wherein said vernier means includes threadedly engaging members which move longitudinally respecting one another upon rotation of one of said members respecting the other.

11. The battery of claim 10 wherein said longitudinal movement of said threadedly engaging members is perpendicular to said cell plates.

12. A battery comprising:
   a. a plurality of lead-acid cells arranged in at least one horizontal row said cells including vertically oriented lead metal plates therewithin;
   b. facing surfaces of adjacent cells having vertically extending channels formed therein for convective cooling by air flow along said channels.

13. The battery of claim 12 wherein adjacent cells are free-standing respecting one another and further comprising means for maintaining said facing surfaces of adjacent cells spaced from each other.

14. The battery of claim 13 wherein said channels in said facing surfaces substantially face each other.

15. The battery of claim 12 wherein said cells are in a plurality of vertically stacked horizontal rows and facing surfaces of horizontally adjacent cells have vertically extending channels formed therein for convective cooling by air flow along said channels.

16. The battery of claim 15 wherein said channels of said cells in said vertically stacked horizontal rows are substantially vertically aligned.

17. The battery of claim 16 further comprising means for maintaining said facing surfaces of adjacent cells spaced from each other.

18. The battery of claim 17 wherein said space maintaining means is planar.

19. The battery of claim 18 wherein said planar space maintaining means lies across horizontally facing mouths of said channels.

20. The battery of claim 19 wherein said channels are defined by spaced apart ribs running substantially the vertical height of said cells, spaced from one another more than rib horizontal height measured transversely to said cell.

21. The battery of claim 20 wherein said ribs are integral with walls of thermoplastic cases of said cells.

22. The battery of claim 21 wherein said planar space maintaining means facingly contact outwardly facing surfaces of said ribs.

23. The battery of claim 22 wherein said planar space maintaining means extend vertically between cells in said vertically stacked horizontal rows.

24. A lead-acid battery including:
   a. a plurality of vertically stackable interchangeable cell modules without cells of a given module bearing the weight of cells in a higher module, each module including:
      (1) a plurality of interchangeable lead-acid cells arranged spaced apart and adjacent to one another in horizontal rows, cells of the rows being individually free-standing respecting adjacent cells in a row and slidably removably replaceable from the front of the battery, each cell comprising:
         (a) a case;
         (b) vertically oriented planar positive and negative cell plates within the cell case, positioned transversely to the row;
      (2) apertured planar cell support plates underlying and vertically supporting the cells in the horizontal rows, apertures in the support plates communicating with space between adjacent cells vertically supported the support plates;
      (3) webs upstanding from corners of the cell support plates receiving the weight of vertically higher modules;
   b. cell support plates of a next higher module resting on the webs upstanding from an immediately lower module;
   c. the modules being arranged that respective horizontally positioned cells are vertically aligned so that spaces between horizontally adjacent cells define channels between the cells for cooling air flow; and
   d. means for adjustably applying compressive force to cell plates within one of the horizontal rows of cells from the cell case exterior.

* * * * *